US010031984B2

United States Patent
Kazama

(10) Patent No.: US 10,031,984 B2
(45) Date of Patent: Jul. 24, 2018

(54) METHOD AND DEVICE FOR SIMULATING SURFACE TENSION

(71) Applicant: FUJITSU LIMITED, Kawasaki-shi, Kanagawa (JP)

(72) Inventor: Masaki Kazama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 686 days.

(21) Appl. No.: 14/621,896

(22) Filed: Feb. 13, 2015

(65) Prior Publication Data

US 2015/0161305 A1    Jun. 11, 2015

Related U.S. Application Data

(63) Continuation of application No. PCT/JP2012/074295, filed on Sep. 21, 2012.

(51) Int. Cl.
*G06F 17/50* (2006.01)

(52) U.S. Cl.
CPC ...... *G06F 17/5009* (2013.01); *G06F 2217/16* (2013.01)

(58) Field of Classification Search
CPC .................. G06F 17/5009; G06F 2217/16
See application file for complete search history.

(56) References Cited

U.S. PATENT DOCUMENTS

2011/0172948 A1    7/2011   Gotoh et al.

FOREIGN PATENT DOCUMENTS

| JP | 2001-156140 | 6/2001 |
|----|-------------|--------|
| JP | 2008-111675 | 5/2008 |
| JP | 2009-129193 | 6/2009 |
| JP | 2011-123835 | 6/2011 |
| WO | 2010/032656 A1 | 3/2010 |

OTHER PUBLICATIONS

Liu, Moubin et al., "Dissipative particle dynamics simulation of pore-scale multiphase fluid flow", Water Resources Research, vol. 43, WO4411, doi:10.1029/2006WR004856 (2006).*
Tsodikov, Oleg V. et al., "Novel Computer Program for Fast Exact Calculation of Accessible and Molecular Surface Areas and Average Surface Curvature", vol. 23, No. 6 Journal of Computational Chemistry, doi:10.1002/jcc.10061 (2001).*
Zhang, Yizhong et al., "A Deformable Surface Model for Real-Time Water Drop Animation" IEEE Transactions on Visualization and Computer Graphics, vol. 18, No. 8 pp. 1281-1289 (Aug. 2012).*
Adami et al., "A new surface-tension formulation for mulit-phase SPH using a reproducing divergence approximation", Journal of Computational Physics 229 (2010).*

(Continued)

*Primary Examiner* — Kamini S Shah
*Assistant Examiner* — Steven W Crabb
(74) *Attorney, Agent, or Firm* — Staas & Halsey LLP

(57) ABSTRACT

A processor calculates, in accordance with a convex hull configuration algorithm, an interface of a fluid model expressing the fluid as a collection of particles according to an input boundary condition and initial condition. The processor calculates surface energy of the calculated interface. The processor calculates surface tension of the interface according to the calculated surface energy. The processor outputs, for each predetermined time interval, a state of the fluid according to the calculated surface tension.

14 Claims, 26 Drawing Sheets

(56) References Cited

OTHER PUBLICATIONS

International Search Report dated Dec. 4, 2012 in corresponding international application PCT/JP2012/074295.
Written Opinion dated Dec. 4, 2012 for PCT/JP2012/074295.
T. Hongo et al., "Modeling of Surface Tension Acting on Gas-Liquid Interface in Three-Dimensional Incompressible SPH Computation", 23rd Symposium of Computational Fluid Dynamics, A8-5, 2009, 1 pg.
M. Agawa et al., "incompressible SPH Simulation of a Liquid Flowing down an inclined Plane", 23rd Symposium of Computational Fluid Dynamics, A9-4, 2009, pp. 1-5.
K. Nomura et al., "Numerical Analysis of Droplet Breakup Behavior using Particle Method", Journal of Nuclear Science and Technology, vol. 38, No. 12, 2001, pp. 1057-1064.
Koizumi, "Motion accompanied with forming meniscus", Dissertation at Tokyo University of Marine Science and Technology, 2007, [retrieved from Internet on Nov. 19, 2012], pp. 24-33.

\* cited by examiner

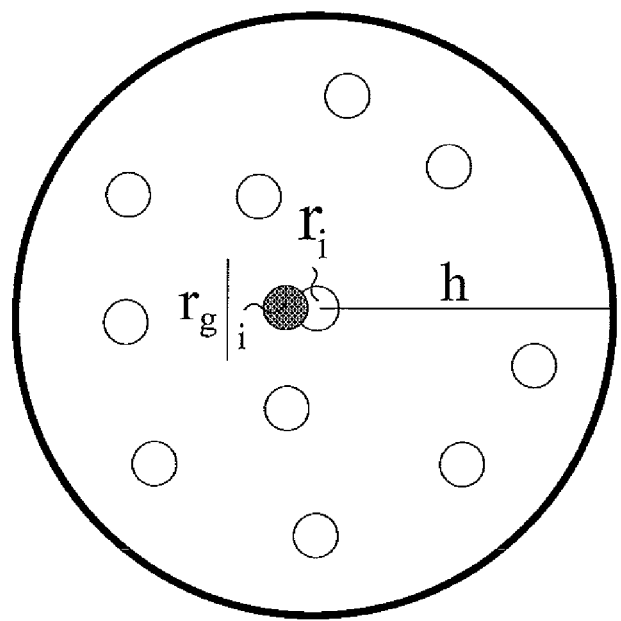
F I G. 3

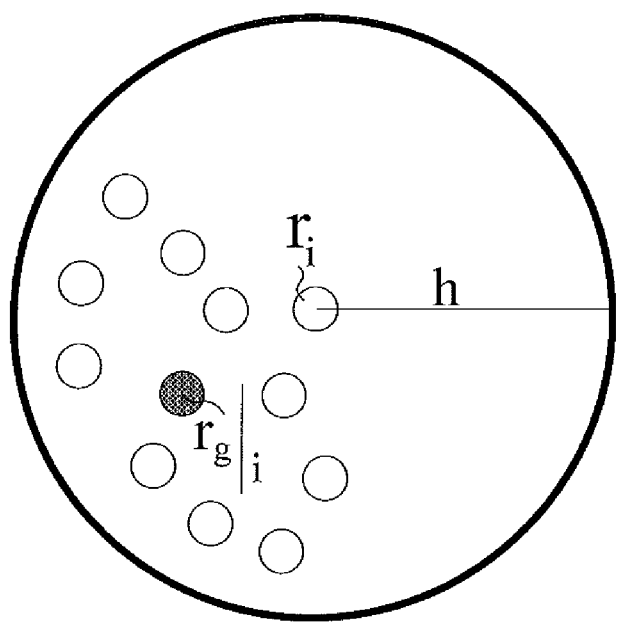
F I G. 4

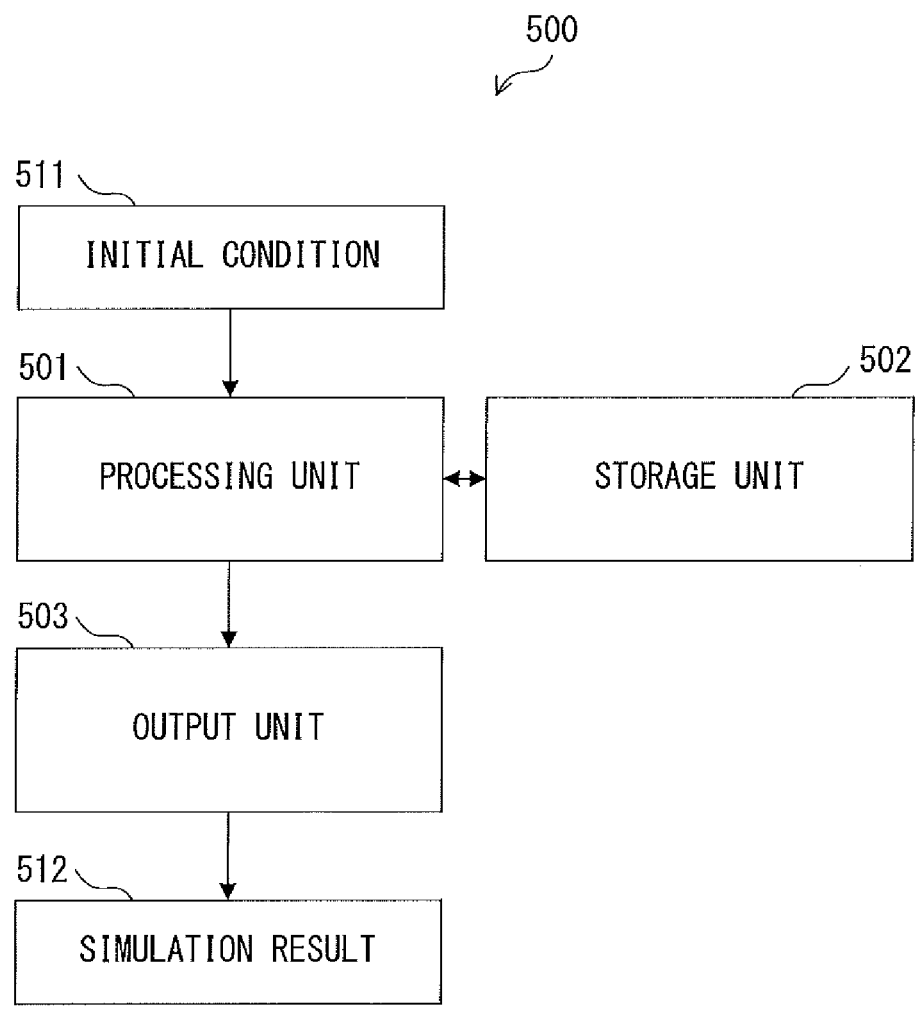
F I G. 5

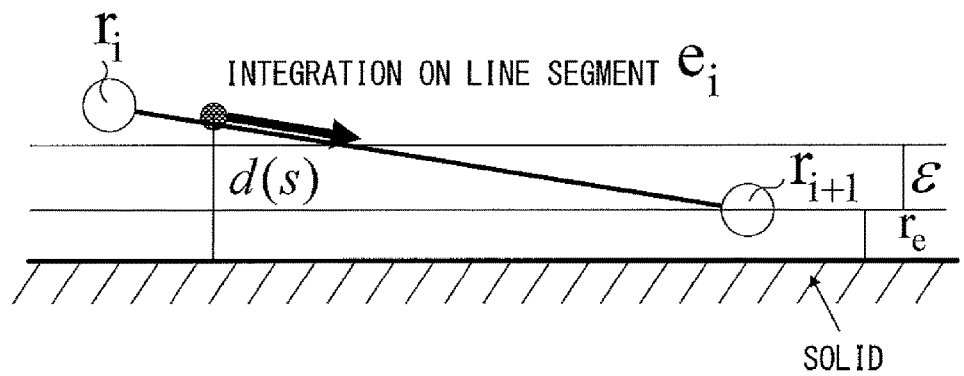
F I G. 1 5

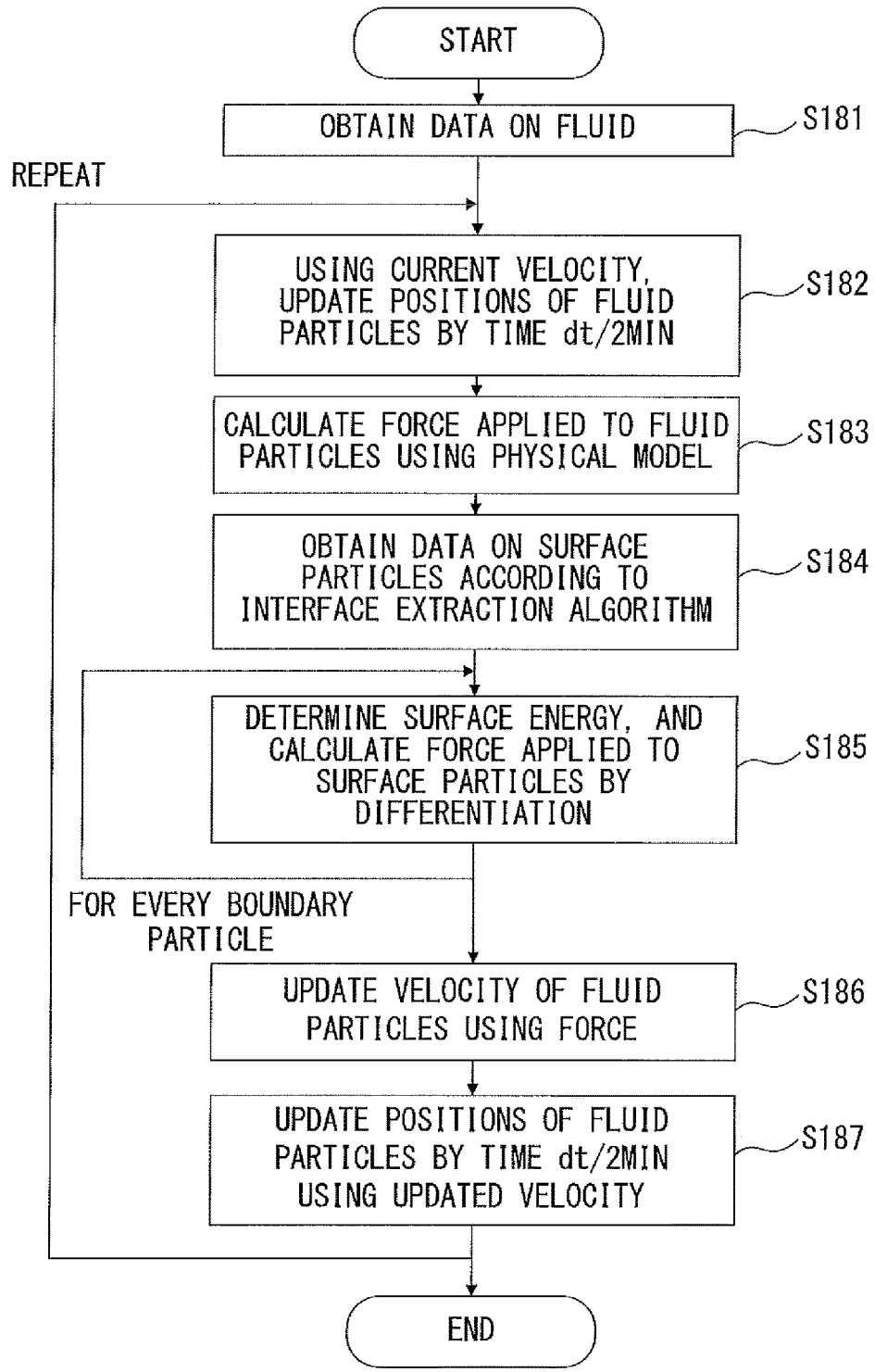
F I G. 1 8

METHOD AND DEVICE FOR SIMULATING SURFACE TENSION

CROSS-REFERENCE TO RELATED APPLICATION

This application is a continuation application of International Application PCT/JP2012/074295 filed on Sep. 21, 2012 and designated the U.S., the entire contents of which are incorporated herein by reference.

FIELD

The embodiments discussed herein are related to a simulation method and a simulation device.

BACKGROUND

With the improvement on computer power in recent years, simulation techniques have also gradually developed. Consequently, simulations have been used in various fields of application.

As numerical calculation techniques of solving problems of continuums such as fluids and elastic bodies, a finite difference method, a finite element method, a finite volume method, and so on have been often used to determine an approximate solution of a differential equation on the basis of a lattice. In recent years, such numerical calculation techniques have been developed to utilize numerical calculations in fields of application such as the Computer Aided Engineering (CAE), thereby solving a problem of an interaction between a fluid and a structure.

However, in techniques that use a lattice, such as the finite element method and the finite volume method, when there is a problem of the presence of an interface such as a free surface or a problem of the occurrence of a moving boundary such as a fluid-structure interaction problem, such a problem is dealt with in a complex way, and hence it is often difficult to create a program.

By contrast, in particle methods that do not use a lattice, such as the Moving Particle Semi-implicit (MPS) method and the Smoothed Particle Hydrodynamics (SPH) method, special treatments are not used to deal with moving boundaries. Thus, the particle methods have been widely used in recent years.

The particle methods have been developed to readily deal with a boundary that moves and is deformed, e.g., a free surface. However, when a continuum becomes a simple particle group due to a discretization method, it becomes unclear where a boundary of a continuum is, as depicted in FIG. 1. Accordingly, the particle methods do not have a unified technique for solving a problem wherein a boundary such as surface tension is explicitly dealt with, and there are some technologies separately developed (see for example patent document 1, non-patent documents 1, 2, and 3).

For example, Patent document 1 describes a technique wherein a potential is configured from an interparticle distance so as to cause an attraction between particles, as depicted in FIG. 2. This is a technique created on the basis of the idea that surface tension results from nonuniformity of an intermolecular force on a surface.

In the techniques of non-patent documents 1, 2, and 3, on the assumption that particles with a decreased number of neighboring particles are particles at a boundary, surface tension is added to the particles at the boundary.

Non-patent documents 2 and 3 introduce a model for achieving wettability.

Patent document 1: Japanese Laid-open Patent Publication No. 2008-111675

Non-Patent Documents

Non-patent document 1: T. Hongo, M. Shigeta, S. Izawa, and Y. Fukunishi, "Modeling of Surface Tension Acting on Gas-Liquid Interface in Three-Dimensional Incompressible SPH Computation", 23th Symposium of Computational Fluid Dynamics, A8-5 (2009)

Non-patent document 2: M. Agawa, M. Shigeta, S. Izawa, and Y. Fukunishi, "Incompressible SPH Simulation of a Liquid Flowing down an Inclined Plane", 23th Symposium of Computational Fluid Dynamics, A9-4 (2009)

Non-patent document 3: K. Nomura, S. Koshizuka, Y. Oka, and H. Obata, "Numerical Analysis of Droplet Breakup Behavior using Particle Method", Journal of Nuclear Science and Technology, Vol. 38, No. 12, pp. 1057-1064 (2001)

SUMMARY

According to an aspect of the embodiments, a non-transitory computer-readable recording medium has stored therein a program for causing a computer to execute a process for simulating surface tension of a fluid. The process includes calculating, in accordance with a convex hull configuration algorithm, an interface of a fluid model expressing the fluid as a collection of particles according to an input boundary condition and initial condition, calculating surface energy of the calculated interface, calculating surface tension of the interface according to the calculated surface energy and outputting, for each predetermined time interval, a state of the fluid according to the calculated surface tension.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates a barycenter of particles to which weights are assigned;

FIG. 4 illustrates a barycenter of boundary particles;

FIG. 5 illustrates an exemplary configuration of a simulation device to which the present invention is applied;

FIG. 15 illustrates integration on a line segment;

FIG. 18 is a flowchart illustrating the flow of calculation of a surface tension term;

DESCRIPTION OF EMBODIMENTS

Figure 1:
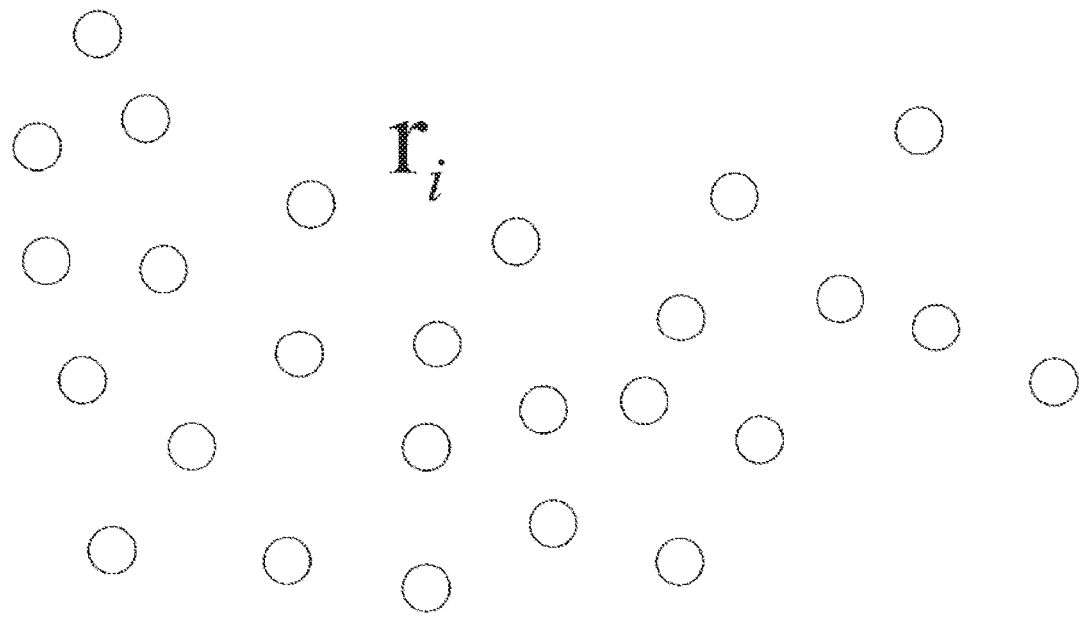
FIG. 1 illustrates a problem in a particle method.
Figure 2:
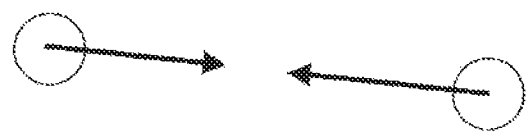
FIG. 2 illustrates an attraction between particles.

A nonphysical behavior occurs when a model that uses a particle method to represent an effect of surface tension exerted on only a surface is implemented in a manner such that particles that are not on the surface are also affected. Above all, it disadvantageously becomes difficult to control dynamic motion of a wetting angle.

In one possible example, in a technique wherein a potential is configured from an interparticle distance so as to cause an attraction between particles, or in calculation of surface tension according to a technique wherein, on the assumption that particles with a decreased number of neighboring particles are particles at a boundary, surface tension is added to the particles at the boundary, not only particles on a surface but also internal particles are affected.

Particularly, in the technique wherein a potential is configured from an interparticle distance so as to cause an attraction between particles, an attraction is caused between all particles, thereby applying a force resulting from surface tension even to internal particles.

In the technique wherein, on the assumption that particles with a decreased number of neighboring particles are particles at a boundary, surface tension is added to the particles at the boundary, particles on a surface are predicted from information on surrounding particles, and surface tension is introduced. In this case, in calculation, particles within a fluid are also defined as particles on a surface and have surface tension applied thereto. Accordingly, a contact surface is not captured, and hence it is difficult to handle, for example, motions associated with a wetting angle.

In the technique wherein, on the assumption that particles with a decreased number of neighboring particles are particles at a boundary, surface tension is added to the particles at the boundary, a particle i is defined as an particle on a surface, and surface tension is calculated using procedures 1-3 below, where particle distribution is $$r_i = (x_i, y_i)$$

(i indicates a particle number).

<Procedure 1>

The following amount is calculated.

$$r_g|_i = \frac{\sum_j r_j W(|r_i - r_j|, h)}{\sum_j W(|r_i - r_j|, h)} \quad \text{(Formula 1)}$$

A character "W" in the right hand side is a kernel function (which may be referred to as a weight function), and, the spline function below is used in the technique wherein, on the assumption that particles with a decreased number of neighboring particles are particles at a boundary, surface tension is applied to the particles at the boundary.

$$W(r, h) = \begin{cases} \left(1 - 1.5\left(\frac{r}{h}\right)^2 + 0.75\left(\frac{r}{h}\right)^3\right)/\beta & 0 \le \frac{r}{h} < 1, \\ 0.25\left(2 - \frac{r}{h}\right)^3/\beta & 1 \le \frac{r}{h} < 2, \\ 0 & 2 \le \frac{r}{h} \end{cases} \quad \text{(Formula 2)}$$

In this formula, h indicates a radius of influence between particles, and an interval that is about 2 to 3 times as great as an average particle interval in an initial state is often used; $\beta$ is a value adjusted in a manner such that the quantity of full space integration of the kernel function becomes 1, and this value is $0.7\pi h^2$ for two dimensions and is $\pi h^3$ for three dimensions.

The formula 1 above expresses a barycenter of particles centered around the particle i within a radius h and to which weights are assigned according to the kernel function, as depicted in FIG. 3.

<Procedure 2>

A distance between the barycenter of formula 1 and the particle i is calculated.

$$d_i = |r_g|_i - r_i| \quad \text{(Formula 3)}$$

<Procedure 3>

When $d_i$ is equal to or greater than a predetermined multiple (e.g., 0.15 time) of the average particle interval, the particle is defined as a particle on a surface, and surface tension is added to the particle i.

In procedures 1-3, as depicted in FIG. 4, a particle surrounded by particles whose distribution is nonuniform is defined as a particle at a boundary and has surface tension added thereto. However, when an internal particle happens to have, during calculation, the "$d_i$" exceeding the threshold "0.15 time of the average particle interval", surface tension is also added.

The following will describe embodiments in detail with reference to the drawings.

In an embodiment, a simulation-target fluid is considered as a collection of particles, and, according to the distribution of the particles (point distribution), a computational geometry technique based on a convex hull configuring method is used to determine an interface configuring a boundary between the simulation-target fluid and a gas or solid, i.e., a substance different from the fluid, from particles present at the interface. Surface energy is expressed using particles configuring the interface, and a surface tension term is calculated by calculating a first variation in the surface energy.

Phases that are in contact with a fluid subjected to a particle method simulation but are separated from the fluid by an interface, i.e., fluid phases (phases in a liquid state), gas phases (phases in a gaseous state), and solid phase (phases in a solid state), will hereinafter be referred to as "another phase (other phases)".

In the configuring of surface energy, differences are performed by using a model wherein surface tension is changed for each surface so that wettability of a fluid and an attachment phenomenon is expressed.

FIG. 5 illustrates an exemplary configuration of a simulation device to which the present invention is applied.

In FIG. 5, a simulation device 500 includes a processing unit 501, a storage unit 502, and an output unit 503, and performs particle-method-based numerical calculation according to an initial condition 511 and outputs a simulation result 512.

The storage unit 502 stores information on formulae for executing a simulation program to which the invention has been applied.

The processing unit 501 performs simulation processes to which the invention has been applied, i.e., simulation processes which will be described hereinafter with reference to first to third embodiments.

The output unit 503 outputs a simulation result 512 executed by the processing unit 501.

First Embodiment

A two-dimensional interface extracting method will be described with reference to a first embodiment.

Two-dimensional interface extraction in accordance with the first embodiment is achieved by first determining a closed curve containing a two-dimensional particle group and then determining a recess on the closed curve.

First, descriptions will be given of how to determine a closed curve.

Consideration will be given to a two-dimensional particle group (point group) $r_i$. Note that i indicates a particle number.

Descriptions will be given of a method of determining a closed curve containing such a point group.

Figure 6:
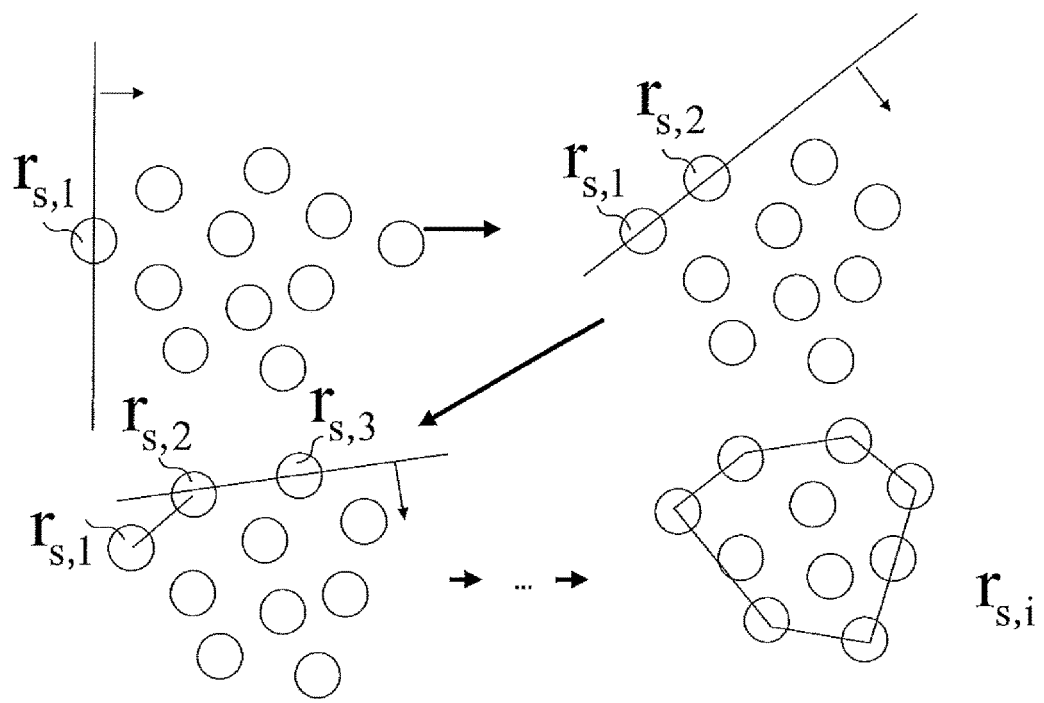
FIG. 6 illustrates a method of determining a closed curve containing a point group.

FIG. 6 illustrates a method of determining a closed curve containing a point group.

With reference to the first embodiment, descriptions will be given of a method of determining a closed curve in first to fourth procedures using a Gift Wrapping method, i.e., a convex hull configuring method.

<First Procedure>

Let $r_{s,l}$ be a particle having a minimum x-coordinate value in the particle group $r_i$.

<Second Procedure>

With reference to a reference line segment $s_i=(0, 1)$ and every non-boundary particle $r_j$, an angle formed by the line segment $s_i$ and $r_j-r_{s,l}$ is measured, a minimum index j2 is searched for, and $r_{s,2}=r_{j2}$ is satisfied.

<Third Procedure>

$R_{s,k}-r_{s,k-1}$ is defined as a reference line segment in accordance with k=2, an angle formed with $r_j-r_{s,k}$ is calculated, the minimum index j2 is searched for, and $r_{s,k+1}=r_{j2}$ is satisfied.

<Fourth Procedure> k is incremented by 1, and the third procedure described above is repeated until $r_{s,k}=r_{s,l}$ is satisfied.

Figure 7:
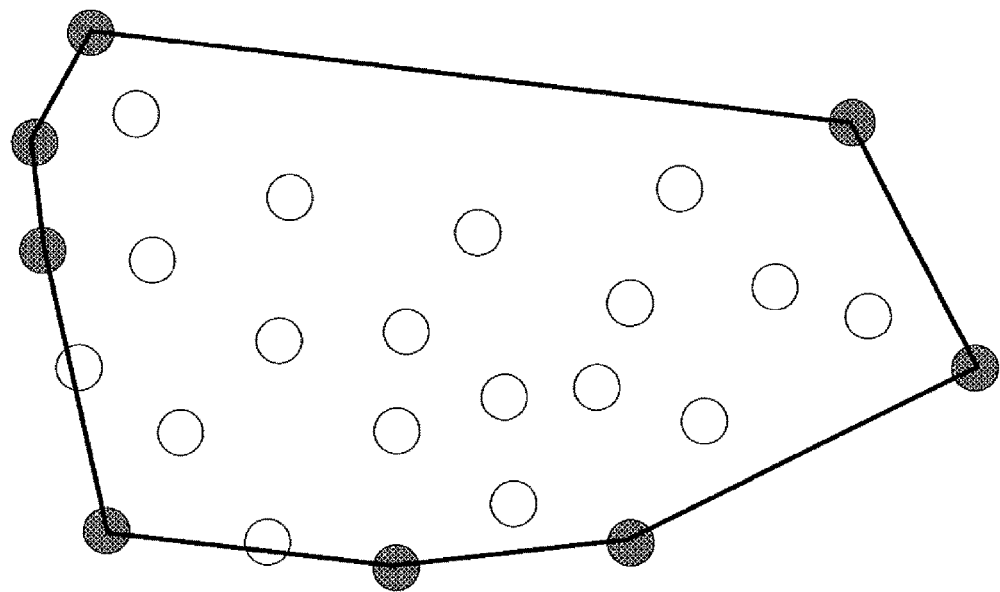
FIG. 7 illustrates a convex hull closed curve.

Linking a point sequence $r_{s,i}$ obtained using such procedures allows a convex hull closed curve to be determined as depicted in FIG. 7.

Figure 8:
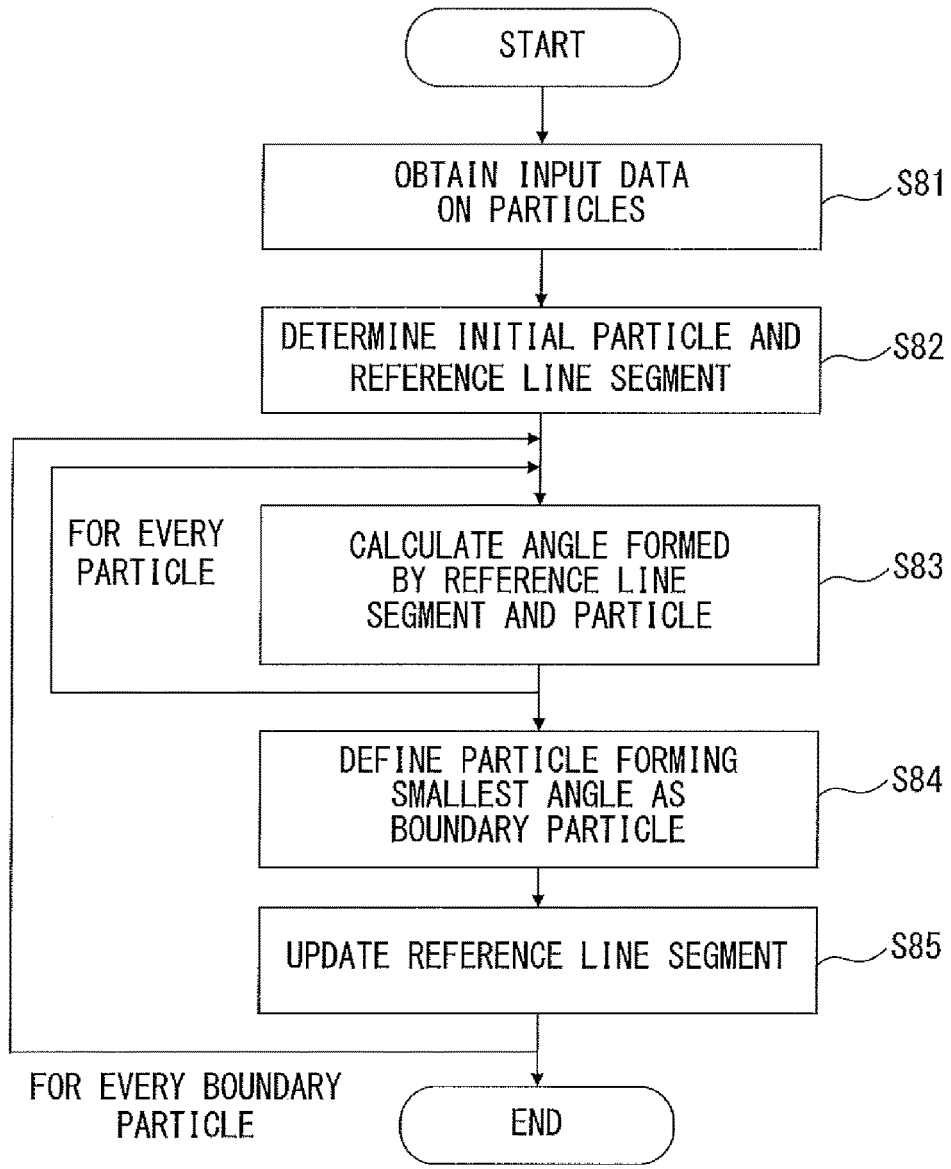
FIG. 8 is a flowchart illustrating the flow of a process of determining a closed curve containing a point group.

FIG. 8 is a flowchart illustrating the flow of a process of determining a closed curve containing a point group.

In step S81, input data on particles is obtained. Step S81 corresponds to the first procedure described above.

In step S82, an initial particle and a reference line segment are determined as in the second procedure above. In step S83, for every particle, an angle formed by the reference line segment and the particle is calculated. Steps S82 and S83 correspond to the second procedure above.

For all boundary particles, in step S84, a particle forming a smallest angle is defined as a boundary particle, and, in step S85, the reference line segment is updated. Steps S84 and S85 correspond to the third and fourth procedures described above.

The following will describe how to determine, in fifth to ninth procedures, a recess from the point sequence $r_{s,i}$ on the closed curve (convex hull) determined as described above.

<Fifth Procedure>

A distance between a particle i and a particle i+1, i.e., $d_{i,i+1}=|r_{s,i}-r_{s,i+1}|$, is calculated.

<Sixth Procedure>

Figure 9:
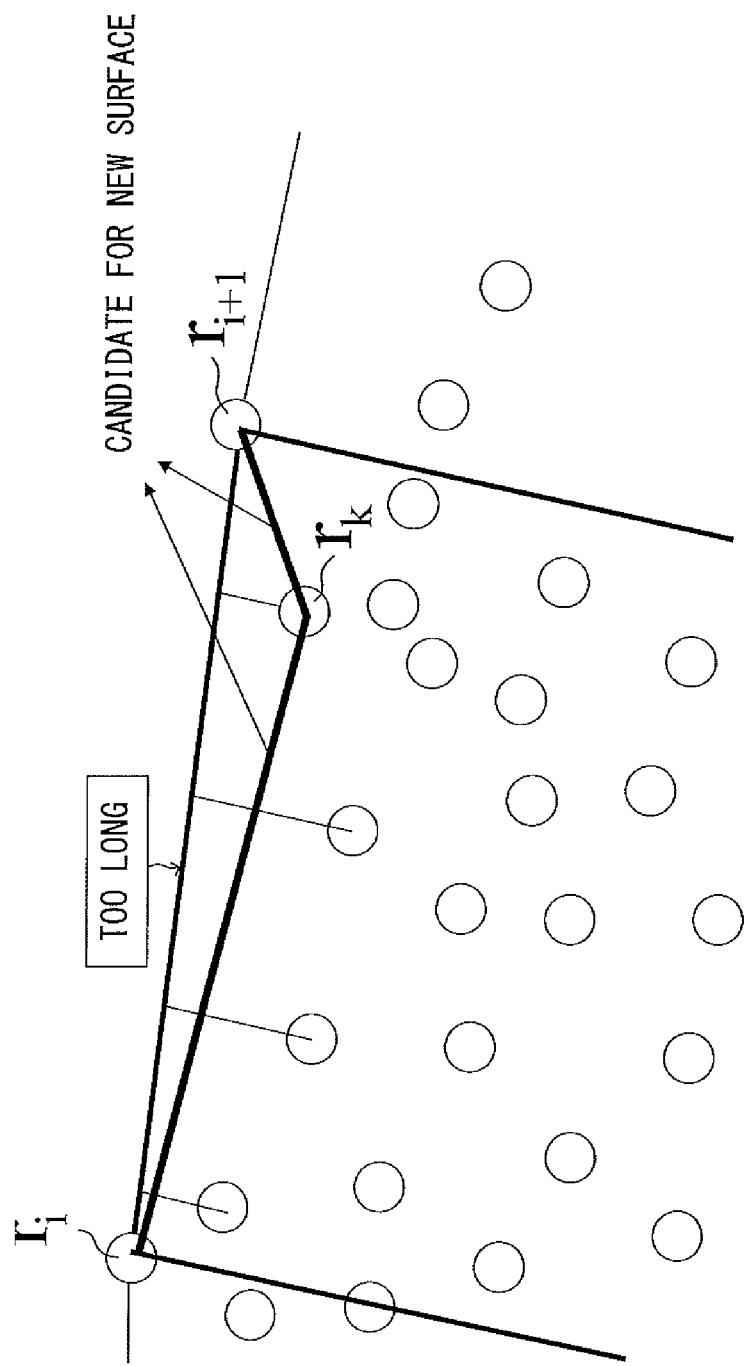
FIG. 9 illustrates a method of determining a recess.

When $d_{j,j+1}$, i.e., the distance between the particles above, is greater than a predetermined threshold (approximately several times greater than a radius of influence h), the distance is too long in this case, $r_k$, i.e., a particle from among the particle group with a shortest projection extending onto a line segment $r_{s,i}-r_{s,i+1}$ (except for a situation in which the projection is not on the line segment), is defined as a new candidate for an interface particle, as depicted in FIG. 9.

<Seventh Procedure>

When both $|r_{s,i}-r_k|$ and $|r_{s,i+1}-r_k|$ are smaller than $|r_{s,i}-r_{s,i+1}|$, $r_k$ is inserted between the i-th and (i+1)-th interface particles.

When the relationship above is not satisfied, the flow shifts to procedure 9 below.

<Eighth Procedure>

The fifth to seventh procedures described above are repeated for the line segments $r_{s,i}-r_k$ and $r_{s,i+1}-r_k$, and the process ends when the distance becomes less than a threshold or when an interface candidate particle is no longer present.

<Ninth Procedure>

The fifth to eighth procedures are performed for all i's.

Figure 10:
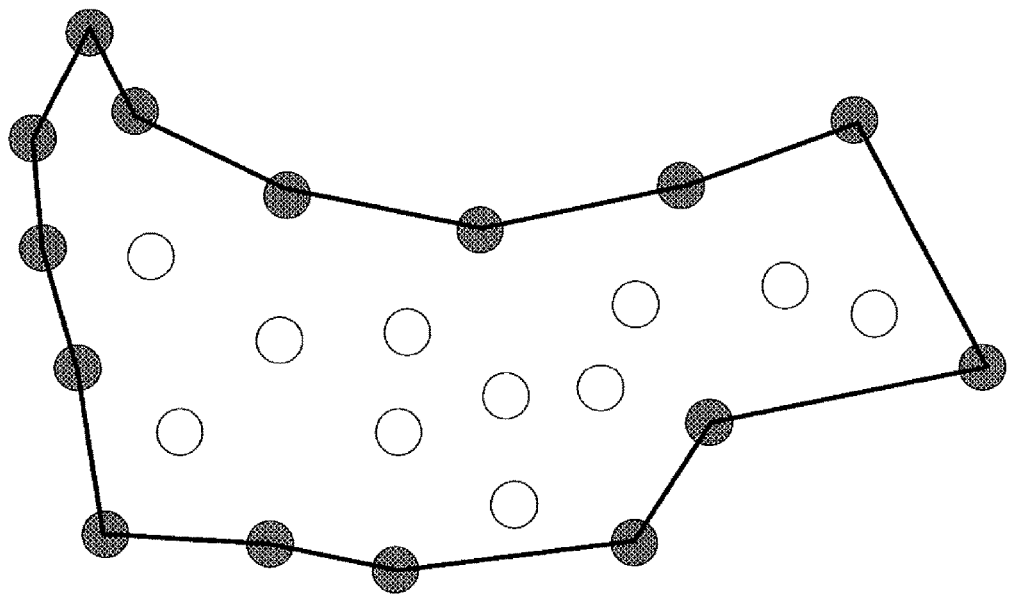
FIG. 10 illustrates a closed curve modified using a method of determining a recess.

Through such procedures, the recess depicted in FIG. 10 may be determined.

Figure 11:
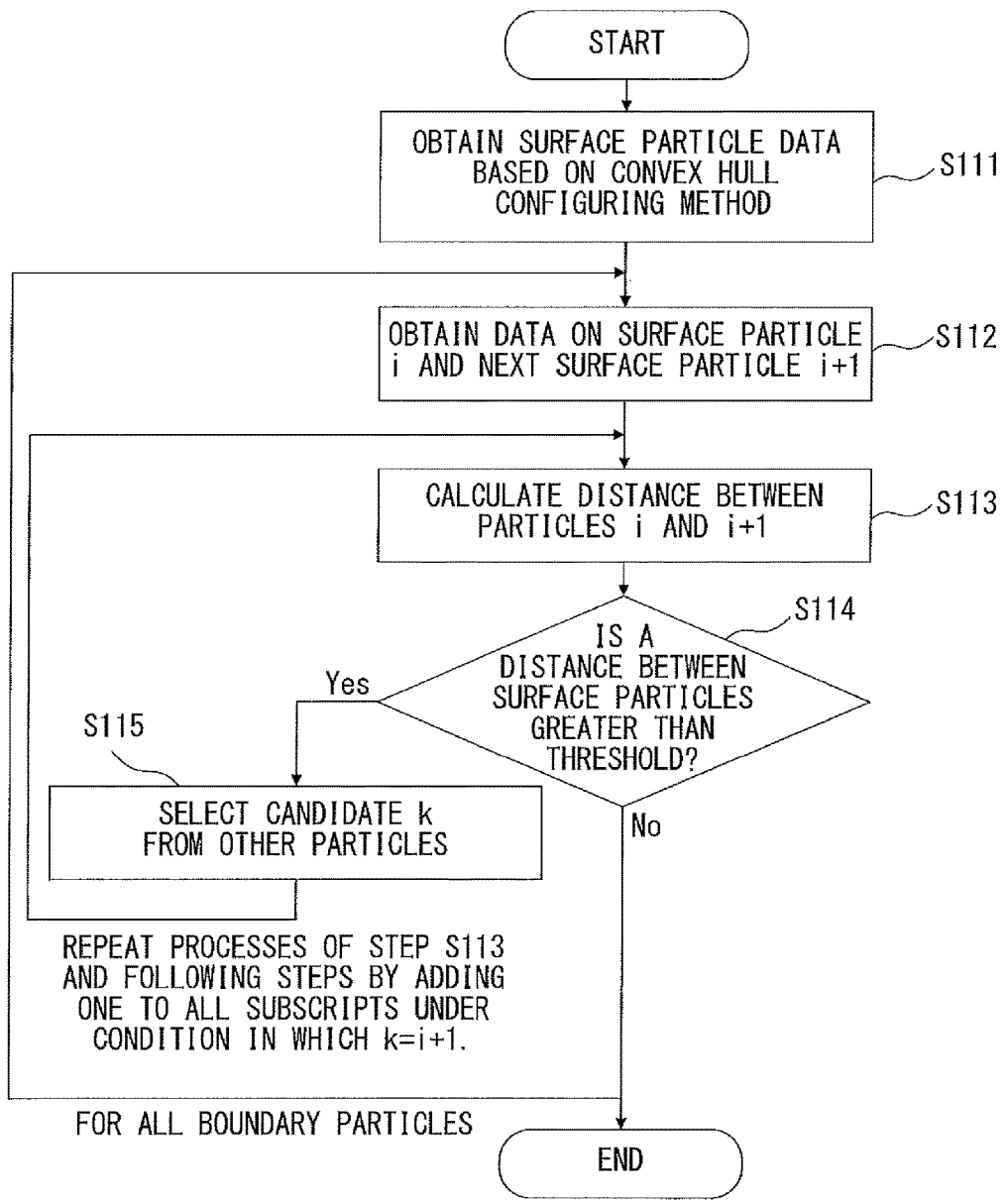
FIG. 11 is a flowchart illustrating the flow of a process of determining a recess.

FIG. 11 is a flowchart illustrating the flow of a process of determining a recess.

In step S111, surface particle data based on the convex hull configuring method described above with reference to FIGS. 6-8 is obtained, and, in step S112, data on a surface particle i and a next surface particle i+1 is obtained.

In step S113, the distance between the particles i and i+1 is calculated. Step S113 corresponds to the fifth procedure above.

In step S114, it is determined whether a distance between the surface particles is greater than a predetermined threshold. When the distance is greater than the threshold (step S114: Yes), a candidate k is selected from other particles in step S115, and the processes of step S113 and the following steps are repeated under a condition in which k=i+1. The sequence that starts with step S114 (YES) and step S115 and then returns to step S113 corresponds to the sixth to eighth procedures above.

Steps S112 to S114 are performed for all boundary particles (i). This corresponds to the ninth procedure above.

Second Embodiment

The following will describe a method of calculating a surface tension term with reference to a second embodiment.

In the calculating of a surface tension term in accordance with the second embodiment, surface tension is calculated from a closed surface obtained in the first embodiment.

Figure 12:
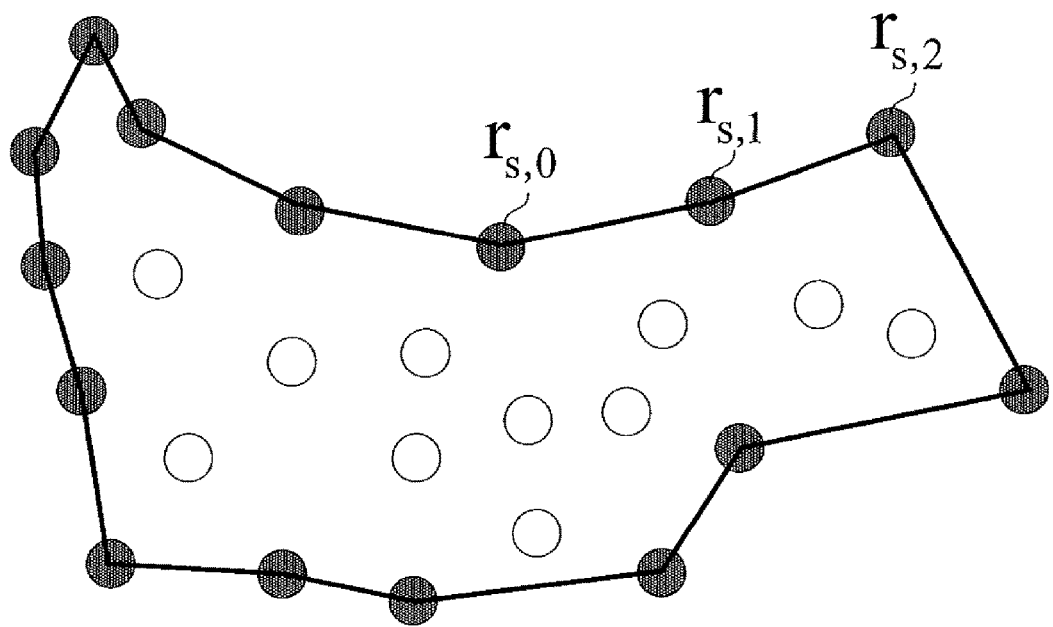
FIG. 12 illustrates a point sequence of surface particles of a fluid.

Assume that a point sequence $r_{s,i}$ (i=0, ..., n−1) is obtained as the positions of particles on a surface in accordance with the first embodiment, and that, in the case of two dimensions, a surface is configured between particles i and i+1, as depicted in FIG. 12. Assume that, in the case of three dimensions, a surface is configured by, for example, a triangular element between three points.

Surface energy of a fluid may typically be defined as follows:

$$E_s = \oint \gamma_g \chi dS + \oint \gamma_s (1-\chi) dS \qquad \text{(Formula 4)}$$

where a domain of integration in the right hand side expresses the entirety of a boundary surface of the fluid, and $\chi$ is 1 for a portion where the fluid is in contact with air, and is 0 for the other portions.

Figure 13:
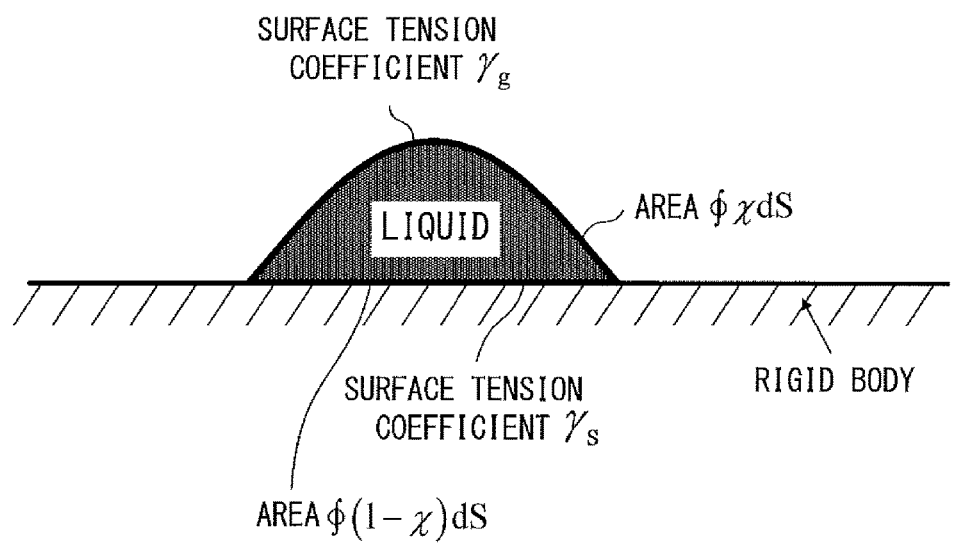
FIG. 13 illustrates surface tension coefficients.

$\gamma_g$ and $\gamma_s$ are respectively indicate a surface tension coefficient of a portion that is in contact with air and a surface tension coefficient of a portion that is in contact with a solid, as depicted in FIG. 13. A key point of an embodiment is how to express formula 4 above using a particle method.

In an embodiment, a point sequence $r_{s,i}$ obtained using an interface extracting method is used to determine surface energy as follows.

$$E_{s,\varepsilon}(r_{s,0}, r_{s,1}, \ldots, r_{s,i}, \ldots) = \qquad \text{(Formula 5)}$$

$$\sum_j \left( \gamma_g \int_{e_{ji}} \chi_\varepsilon(d(r(S)) - r_e) dS + \right.$$

$$\left. \gamma_s \int_{e_j} (1 - \chi_\varepsilon(d(r(S)) - r_e)) dS \right) + \alpha \sum_k \varphi(r_{s,k})$$

$$\varphi(r_{s,k}) = \begin{cases} (1 - \log(d(r_{s,k})/r_e) - d(r_{s,k})/r_e), & d < r_e \\ 0, & \text{otherwise} \end{cases} \qquad \text{(Formula 6)}$$

Figure 14:
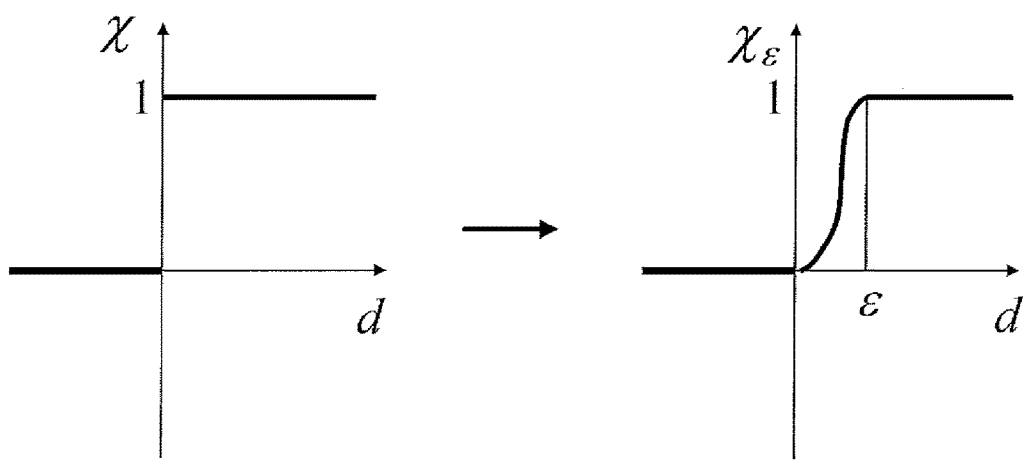
FIG. 14 illustrates a function smoothly approximating surface energy $\chi$ according to a width $\varepsilon$.

In these formulae, $\chi_\varepsilon$ is a function smoothly approximating $\chi$ in formula 4 using a curve of 0 to 1 within a width of $\varepsilon$, as depicted in FIG. 14; d is a function expressing a distance between X, i.e., a point on three dimensions, and a solid. When, for example, a solid wall is at a plane of y=0, $d(r_{s,k}) = y_{s,k}$ is satisfied.

$\chi_\varepsilon(s)$ is 0 when s≤0, is 1 when s≥ε, and, for a range of 0<s<ε, uses a functional type for which some interpolation (e.g., liner interpolation or cubic-function-based interpolation) has been performed.

An integral range $e_j$ is obtained on a line segment $r_{s,j+1} - r_{s,j}$, as depicted in FIG. 15. In an integral calculation, a Gauss integral calculus or the like may be used for numerical integration.

(j), the sum of the first term of the right hand side of formula 5, is obtained between particles (between particles j and j+1), and (k), the sum of the second term, is obtained for all particles. The first term of the right hand side is obtained by discretizing the surface energy of formula 4. Meanwhile, the second term of the right hand side expresses potential energy indicating a boundary condition in which a particle does not pass through a wall, and use of a form such as formula 6 causes a particle to emit infinite potential when a distance between a particle and a solid is 0, thereby suppressing a nonphysical behavior wherein the particle climbs over a wall of the solid.

Using energy of formula 5, a force applied to $r_{s,i}$, i.e., a particle on a surface, may be calculated as follows.

$$F_{s,i} = -\frac{\partial E_{s,\varepsilon}}{\partial r_{s,i}} \qquad \text{(Formula 7)}$$

Formula 7 may be determined using a finite difference approximation.

Figure 16:
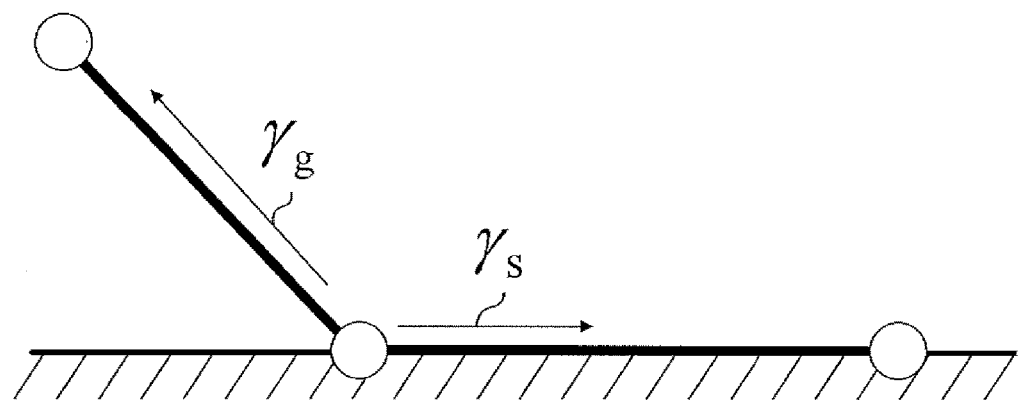
FIG. 16 illustrates an expression of a contact angle.

In formula 5, a surface tension coefficient changes in accordance with which of a solid or gas a contact surface is. As depicted in FIG. 16, the difference achieves a form wherein a contact angle is expressed when a contact surface changes.

Figure 17:
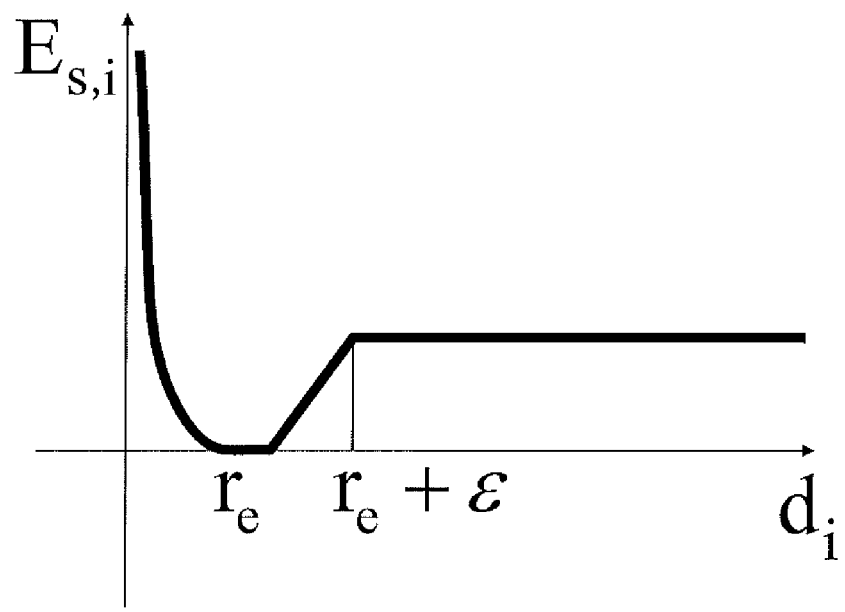
FIG. 17 illustrates a relationship between a distance from a solid and energy.

When $\gamma_s < \gamma_g$, a force to adhere to the solid is exerted because energy becomes lower in a situation in which a particle is in contact with the solid. In the particle method, a condition in which a particle does not pass through a solid is expressed as formula 6, i.e., a potential in the vicinity of a wall, and hence the particle does not come in fully touch with the solid. Accordingly, in the second embodiment, as illustrated in FIG. 17, energy is set in accordance with formula 5 in a manner such that a repulsive force is exerted when the distance from the solid is equal to or less than $\gamma_e$ and such that an adhesive force is exerted when the distance from the solid is equal to or greater than $\gamma_e$ and is less than $\varepsilon + \gamma_e$.

FIG. 18 is a flowchart illustrating the flow of calculation of a surface tension term.

In step S181, data on a simulation-target fluid is obtained, and, in step S182, using a current velocity, the positions of fluid particles are updated by time dt/2 min. In step S183, a force applied to the fluid particles is calculated using a physical model.

In step S184, data on surface particles of the fluid is obtained in accordance with the first embodiment.

In step S185, for every boundary particle, surface energy is determined in the way described above, and a force applied to surface particles is calculated.

When the calculation is finished for all of the boundary particles, the velocity of the fluid particles is updated in step S186, and, in step S187, the positions of the fluid particles are updated by time dt/2 min using the updated velocity.

Then, steps S182-S187 are repeatedly performed.

In addition, instead of the energy above, the following volume energy and contact point energy may be introduced to suppress nonuniformity of surface particles and a change in the volume of the fluid.

Volume Energy:

$$V_e(r_{s,0}, r_{s,1}, \ldots, r_{s,i}, \ldots) = C_g\left(1 - \log\left(\frac{V_0}{V}\right) - \frac{V_0}{V}\right) \qquad \text{(Formula 8)}$$

Contact Point Energy:

$$\text{(Formula 9)}$$

$$N_e(r_{s,0}, r_{s,1}, \ldots, r_{s,i}, \ldots) =$$

$$Km_{s,i} \sum_{i \in \text{contact point}} \left[ \sum_{\text{For every pair}(j,k)\text{of adjacent elements}} \left( \frac{\int_{e_j} dS}{\int_{e_k} dS} + \frac{\int_{e_k} dS}{\int_{e_j} dS} \right) \right]$$

In these formulae, V indicates the volume of the fluid, and the following formula is satisfied.

$$V(r_{s,0}, r_{s,1}, \ldots, r_{s,i}, \ldots) = -\frac{1}{d}\sum_{j}\int_{e_j} r \cdot n \, dS$$

In those formula, n indicates an outward-directed normal unit vector; $C_g$, K, constants; $m_{s,i}$, the mass of a surface particle s,i.

A correction term based on the energy of formulae 8 and 9 may be calculated as follows.

$$F_{f,i} = -\frac{\partial V_e}{\partial r_{s,i}} - \frac{\partial N_e}{\partial r_{s,i}} \qquad \text{(Formula 10)}$$

$V_0$ indicates an initial volume and is also a constant.

Figure 19:
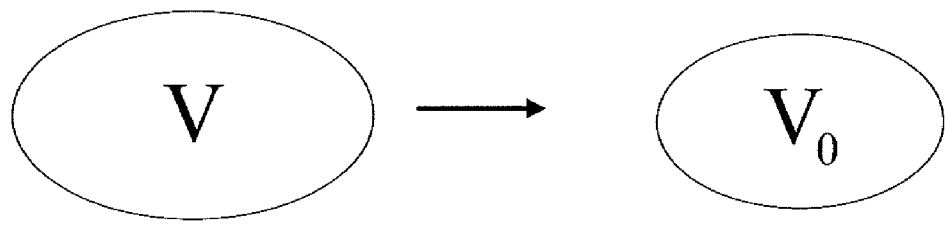
FIG. 19 illustrates an effect of returning a volume.
Figure 20:
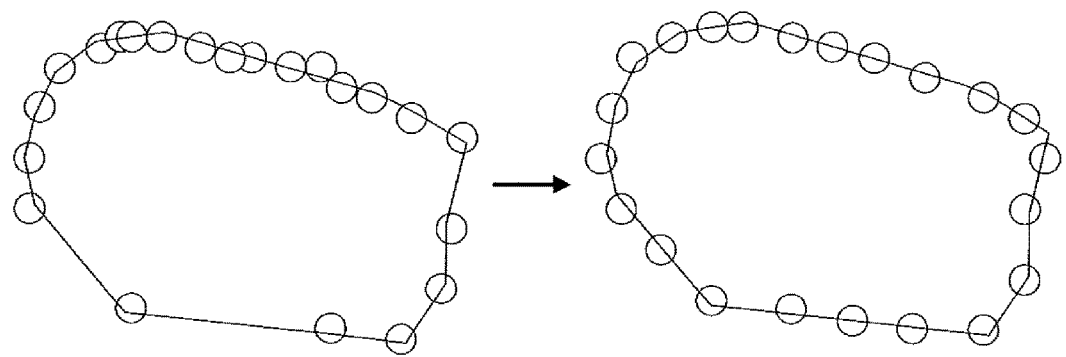
FIG. 20 illustrates an effect of suppressing nonuniformity of surface particles.

The correction term based on the volume energy has an effect of returning the volume to $V_0$, as depicted in FIG. 19. The correction term based on the contact point energy has an effect of suppressing nonuniformity of surface particles, as depicted in FIG. 20.

Third Embodiment

With reference to a third embodiment, the following will describe a method of introducing surface tension in calculating motion of an incompressible viscous fluid using the SPH method.

Figure 21:
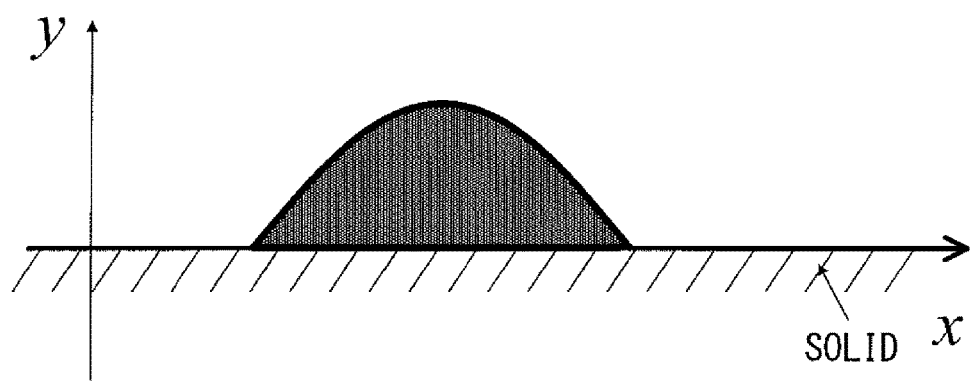
FIG. 21 illustrates an exemplary two-dimensional fluid.

FIG. 21 illustrates an exemplary two-dimensional fluid.

An equation of motion of an incompressible viscous fluid will be considered with reference to a situation as depicted in FIG. 21 (fluid located on a plane of y=0, where a y direction corresponds to a perpendicular upward direction).

$$\frac{D\rho}{Dt} = -\rho \nabla \cdot v, \qquad \text{(Formula 11)}$$

$$\frac{Dv}{Dt} = -\frac{1}{\rho}\nabla p + \nabla \cdot \Pi - gy, \qquad \text{(Formula 12)}$$

$$p = c^2(\rho - \rho_0), \qquad \text{(Formula 13)}$$

Formulae 11, 12, and 13 respectively express a density field, velocity field, and pressure field of the fluid. $\rho(r,t), v(r,t), \rho(r,t), c$ indicates a sound velocity of the fluid.

Formula 11 is based on the mass conservation law, formula 12 is based on the momentum conservation law, and formula 13 is a state equation.

$\Pi$ indicates a viscous stress tensor, and the following formula $$\Pi = \frac{\mu}{2}(\nabla v + \nabla v^T)$$

is satisfied, where $\mu$ (constant) indicates a viscosity coefficient of the fluid.

Formula 11 indicates an increased density for a velocity field to which the fluid is attracted, and, by contrast, indicates a decreased density for a velocity field from which the fluid goes away. The first term in the right hand side of formula 12 is a pressure gradient term, which expresses an effect wherein the fluid generates a force directed from a portion with a large pressure to a portion with a small pressure. The second term in the right hand side indicates a viscous stress term, which expresses an effect of braking a flow. The third term in the right hand side is a gravity term.

g indicates a gravitational acceleration. y indicates a y-direction unit vector.

The third embodiment uses a relationship between a density and a pressure only, as indicated by formula 13 above, but may use a state equation that uses, for example, a general temperature, internal energy, or entropy.

Assume that a surface tension coefficient $\gamma_g$ (constant) is applied to a portion in contact with air and that a surface tension coefficient $\gamma_s$ (constant) is applied to a portion in contact with a solid.

Performing discretization using the SPH method indicated by the formulae 11-13 and introducing the surface tension term in accordance with the second embodiment described above satisfies the following.

$$r_a^* = r_a^n + \frac{dt}{2}v_a^n, \qquad \text{(Formula 14)}$$

$$v_a^{n+1} = v_a^n - 2dt\left[\sum_b m_b\left(\frac{p_{ab}^{n+1/2}}{\rho_b^n \rho_a^n}\right)\right. \qquad \text{(Formula 15)}$$

$$\left(\frac{L_2(r_a^*) + L_2(r_b^*)}{2}\right)\frac{r_a^* - r_b^*}{|r_a^* - r_b^*|}\frac{\partial W(r_{ab}^*, h)}{\partial r_{ab}^*}\right] -$$

$$\frac{1}{2}\sum_b m_b\left(\frac{4\mu\xi}{\rho_a\rho_b}\frac{v_{ab}\cdot r_{ab}^*}{r_{ab}^2 + \eta^2}\right)v_{ab}^i\frac{\partial W(r_{ab}, h)}{\partial r_a^*} -$$

$$gy - \frac{1}{m_a}\frac{\partial E_2}{\partial r_a^*},$$

$$\rho_a^{n+1} = \qquad \text{(Formula 16)}$$

$$\rho_a^n + 2dt\sum_b \frac{m_b\rho_a^n}{\rho_b^n}\left(\frac{v_a^{s,n+1} + v_a^{s,n}}{2} - v_{ab}^{s,n+1/2}\right)\frac{\partial}{\partial r_{ab}^*}W(r_{ab}^*, h),$$

$$r_a^{n+1} = r_a^* + \frac{dt}{2}v_a^{n+1}. \qquad \text{(Formula 17)}$$

Subscripts express particle numbers. That is, $r_a$, $v_a$, $\rho_a$, and $p_a$ respectively indicate the position vector, velocity vector, density, and pressure of an a-th particle.

$m_b$ indicates the density of a b-th particle.

$\xi$ and $\eta$, which are constants, express parameters introduced to calculate a viscosity term.

Formula 15 is obtained by discretizing the equation of motion of formula 12 descried above using a particle method; the second term in the right hand side expresses a pressure gradient term, and the third term expresses a viscous stress term. $y_a$ indicates the y-direction component of $r_a$, $E_2$ indicates surface energy, a form similar to the formula 5 above is achieved, and the following form obtained by specifically performing discretization is used.

$$E_2 = \sum_j \left((\gamma_g - \gamma_s)\frac{(\chi_\varepsilon(y_{s,j} - r_e) + \chi_\varepsilon(y_{s,j+1} - r_e))}{2} + \gamma_s\right)|r_{s,j+1} - r_{s,j}| + \qquad \text{(Formula 18)}$$

$$\alpha\sum_b \varphi_{y=0}(r_b^*)$$

In the formula above, $\varphi_{y=0}$ expresses potential energy indicating a repulsive force from a wall located at y=0, and the following is used.

$$\varphi_{y=0}(r_b) = \begin{cases} (1 - \log(y_b/r_e) - y_b/r_e), & y_a < r_e \\ 0, & \text{otherwise} \end{cases}.$$

α indicates a constant. $r_{s,i}$ expresses a surface particle extracted in accordance with the first embodiment described above, and corresponds to one surface particle of a particle group $r_a$.

The formula $$f_{s,a} = \frac{\partial E_2}{\partial r_a^*},$$

which is obtained by differentiating the formula 18 above, is calculated as follows.

When $r_a$ does not correspond to the surface particle $r_{s,i}$, the following are satisfied.

$$f_{s,a,x} = 0$$

$$f_{s,a,y} = \alpha \frac{\partial \varphi_{y=0}(r_a)}{\partial y_a}$$

When $r_a$ corresponds to the surface particle $r_{s,i}$, $f_{s,a} = (f_{s,a,x}, f_{s,a,y})$ is determined by calculating the following formulaes.

$$f_{s,a,x} = \left[(\gamma_g - \gamma_s)\left(\frac{\chi_\varepsilon(y_{s,i+1} - r_e) + \chi_\varepsilon(y_{s,i} - r_e)}{2}\right) + \gamma_s\right]\left(\frac{x_{s,i} - x_{s,i+1}}{|r_{s,i+1} - r_{s,i}|}\right) +$$

$$\left[(\gamma_g - \gamma_s)\left(\frac{\chi_\varepsilon(y_{s,i} - r_e) + \chi_\varepsilon(y_{s,i-1} - r_e)}{2}\right) + \gamma_s\right]\left(\frac{x_{s,i} - x_{s,i-1}}{|r_{s,i} - r_{s,i-1}|}\right)$$

$$f_{s,a,y} = (\gamma_g - \gamma_s)\left(\frac{\chi'_\varepsilon(y_{s,i+1} - r_e) + \chi'_\varepsilon(y_{s,i} - r_e)}{2}\right)|r_{s,i+1} - r_{s,i}| +$$

$$(\gamma_g - \gamma_s)\left(\frac{\chi'_\varepsilon(y_{s,i} - r_e) + \chi'_\varepsilon(y_{s,i-1} - r_e)}{2}\right)|r_{s,i} - r_{s,i-1}| +$$

$$\left[(\gamma_g - \gamma_s)\left(\frac{\chi_\varepsilon(y_{s,i+1} - r_e) + \chi_\varepsilon(y_{s,i} - r_e)}{2}\right) + \gamma_s\right]\left(\frac{y_{s,i} - y_{s,i+1}}{|r_{s,i+1} - r_{s,i}|}\right) +$$

$$\left[(\gamma_g - \gamma_s)\left(\frac{\chi_\varepsilon(y_{s,i} - r_e) + \chi_\varepsilon(y_{s,i-1} - r_e)}{2}\right) + \gamma_s\right]$$

$$\left(\frac{y_{s,i} - y_{s,i-1}}{|r_{s,i} - r_{s,i-1}|}\right) + \alpha \frac{\partial \varphi_{y=0}(r_a)}{\partial y_a}$$

In the case of two dimensions, contact point energy is as follows.

(Formula 19)

$$N_e(r_1^*, r_2^*, \ldots, r_a^*, \ldots) = \sum_{s,i} \left(\frac{|r_{s,i}^* - r_{s,i-1}^*|}{|r_{s,i}^* - r_{s,i-1}^*|} - \frac{|r_{s,i}^* - r_{s,i+1}^*|}{|r_{s,i}^* - r_{s,i-1}^*|}\right)$$

$$\frac{\partial N_e}{\partial r_a^*} = \begin{pmatrix} \frac{N_e(r_1^*, r_2^*, \ldots, r_a^* + \delta \hat{x}, \ldots) - N_e(r_1^*, r_2^*, \ldots, r_a^* - \delta \hat{x}, \ldots)}{2\delta} \\ \frac{N_e(r_1^*, r_2^*, \ldots, r_a^* + \delta \hat{y}, \ldots) - N_e(r_1^*, r_2^*, \ldots, r_a^* - \delta \hat{y}, \ldots)}{2\delta} \end{pmatrix}$$

In these formulae, an x-direction unit vector and a y-direction unit vector are respectively indicated by the following:

$\hat{x}$
$\hat{y}$

V, the volume of the fluid, may be calculated as follows.

$$V(r_1, r_2, \ldots, r_a, \ldots) = \frac{1}{2} \sum_{s,i} \left(R\left(\frac{\pi}{2}\right) r_{s,i+1} \cdot r_{s,i}\right)$$

In this formula, the following expresses a matrix that rotates a vector by π/2.

$$R\left(\frac{\pi}{2}\right)$$

Volume energy $V_e$ may be calculated as indicated by formula 8, and the following is satisfied.

(Formula 20)

$$\frac{\partial V_e}{\partial r_a^*} = \begin{pmatrix} \frac{V_e(r_1^*, r_2^*, \ldots, r_a^* + \delta \hat{x}, \ldots) - V_e(r_1^*, r_2^*, \ldots, r_a^* - \delta \hat{x}, \ldots)}{2\delta} \\ \frac{V_e(r_1^*, r_2^*, \ldots, r_a^* + \delta \hat{y}, \ldots) - V_e(r_1^*, r_2^*, \ldots, r_a^* - \delta \hat{y}, \ldots)}{2\delta} \end{pmatrix}$$

In addition, a two-dimensional re-standardization matrix is expressed by the following.

$$L_2(r_a^*)$$

The following formulae are satisfied.

(Formula 21)

$$L_2(r_a^*) =$$

$$\begin{pmatrix} \sum_b (x_b^* - x_a^*) \frac{\partial}{\partial x} W(|r_a^* - r_b^*|, h) & \sum_b (x_b^* - x_a^*) \frac{\partial}{\partial y} W(|r_a^* - r_b^*|, h) \\ \sum_b (y_b^* - y_a^*) \frac{\partial}{\partial x} W(|r_a^* - r_b^*|, h) & \sum_b (y_b^* - y_a^*) \frac{\partial}{\partial y} W(|r_a^* - r_b^*|, h) \end{pmatrix}^{-1}$$

$(r = (x, y))$ (Formula 22)

The following are satisfied.

$$r_{ab}^* = r_a^* - r_b^*$$

$$r_{ab}^* = |r_{ab}^*|$$

$$v_a^{s,n} = v_a^n \cdot \frac{r_{ab}^*}{|r_{ab}^*|}$$

$$v_b^{s,n} = v_b^n \cdot \frac{r_{ab}^*}{|r_{ab}^*|}$$

The following are mean values of a time and space determined by solving a one-dimensional Riemann problem between particles a and b.

$$p_{ab}^{n+1/2}, v_{ab}^{s,n+1/2}$$

In particular, these values are determined as follows.

For the particles a and b, the following property amounts are established.

$$q_a^{n,+} = \log(\rho_a^n) + \frac{v_a^{s,n}}{c}$$ (Formula 22)

-continued $$q_a^{n,-} = \log(\rho_a^n) - \frac{v_a^{s,n}}{c} \quad \text{(Formula 23)}$$

$$q_b^{n,+} = \log(\rho_b^n) + \frac{v_b^{s,n}}{c} \quad \text{(Formula 24)}$$

$$q_b^{n,-} = \log(\rho_b^n) - \frac{v_b^{s,n}}{c} \quad \text{(Formula 25)}$$

In addition, gradients are calculated as follows.

$$\nabla \log(\rho)|_a = \sum_k \frac{m_k}{\rho_a} (\log(\rho_k) - \log(\rho_a)) \frac{\partial W(|r_a^* - r_k^*|, h)}{\partial r_a^*} \quad \text{(Formula 26)}$$

$$\nabla v|_{a,2} = \quad \text{(Formula 27)}$$

$$\begin{pmatrix} \sum_k \frac{m_k}{\rho_a}(v_k^x - v_a^x)\frac{\partial W(|r_a^* - r_k^*|, h)}{\partial x_a^*} & \sum_k \frac{m_k}{\rho_a}(v_k^y - v_a^y)\frac{\partial W(|r_a^* - r_k^*|, h)}{\partial x_a^*} \\ \sum_k \frac{m_k}{\rho_a}(v_k^x - v_a^x)\frac{\partial W(|r_a^* - r_k^*|, h)}{\partial y_a^*} & \sum_k \frac{m_k}{\rho_a}(v_k^y - v_a^y)\frac{\partial W(|r_a^* - r_k^*|, h)}{\partial y_a^*} \end{pmatrix}$$

$$\nabla q|_a^{n,+} = \nabla \log(\rho)|_a + \frac{\nabla v|_{a,2} \, r_{ab}}{c} \quad \text{(Formula 28)}$$

$$\nabla q|_b^{n,+} = \nabla \log(\rho)|_b + \frac{\nabla v|_{b,2} \, r_{ab}}{c} \quad \text{(Formula 29)}$$

$$\nabla q|_a^{n,-} = \nabla \log(\rho)|_a - \frac{\nabla v|_{a,2} \, r_{ab}}{c} \quad \text{(Formula 30)}$$

$$\nabla q|_b^{n,-} = \nabla \log(\rho)|_b - \frac{\nabla v|_{b,2} \, r_{ab}}{c} \quad \text{(Formula 31)}$$

The superscripts of the velocity (v) in formula 27 above express components. Using these components, the following terms $$p_{ab}^{n+1/2}, v_{ab}^{s,n+1/2}$$

are determined as follows.

$$q_{ab}^{n+1/2,+} = q_b^{n,+} + \left(\frac{|r_{ab}|}{2} - \frac{cdt}{2}\right)(r_{ab} \cdot \nabla q|_b^{n,+}) \quad \text{(Formula 32)}$$

$$q_{ab}^{n+1/2,-} = q_b^{n,+} - \left(\frac{|r_{ab}|}{2} + \frac{cdt}{2}\right)(r_{ab} \cdot \nabla q|_b^{n,-}) \quad \text{(Formula 33)}$$

$$\rho_{ab}^{n+1/2} = \exp\left(\frac{q_{ab}^{n+1/2,+} + q_{ab}^{n+1/2,-}}{2}\right) \quad \text{(Formula 34)}$$

$$v_{ab}^{n+1/2} = c\left(\frac{q_{ab}^{n+1/2,+} - q_{ab}^{n+1/2,-}}{2}\right) \quad \text{(Formula 35)}$$

$$p_{ab}^{n+1/2} = c^2(\rho_{ab}^{n+1/2} + \rho_0) \quad \text{(Formula 36)}$$

Figure 22:
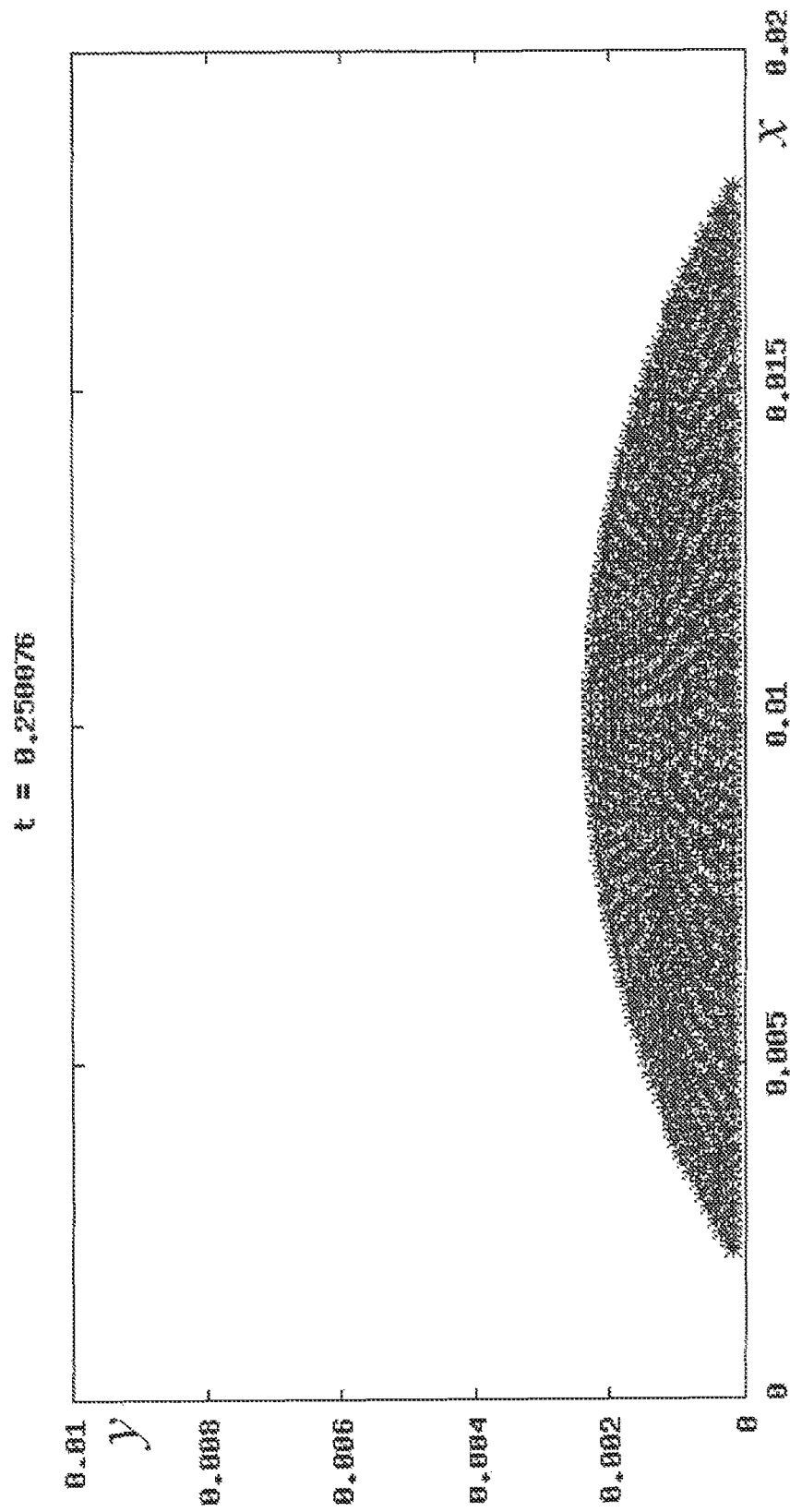
FIG. 22 is a diagram representing wettability with respect to a solid surface with surface tension applied (example 1)
Figure 23:
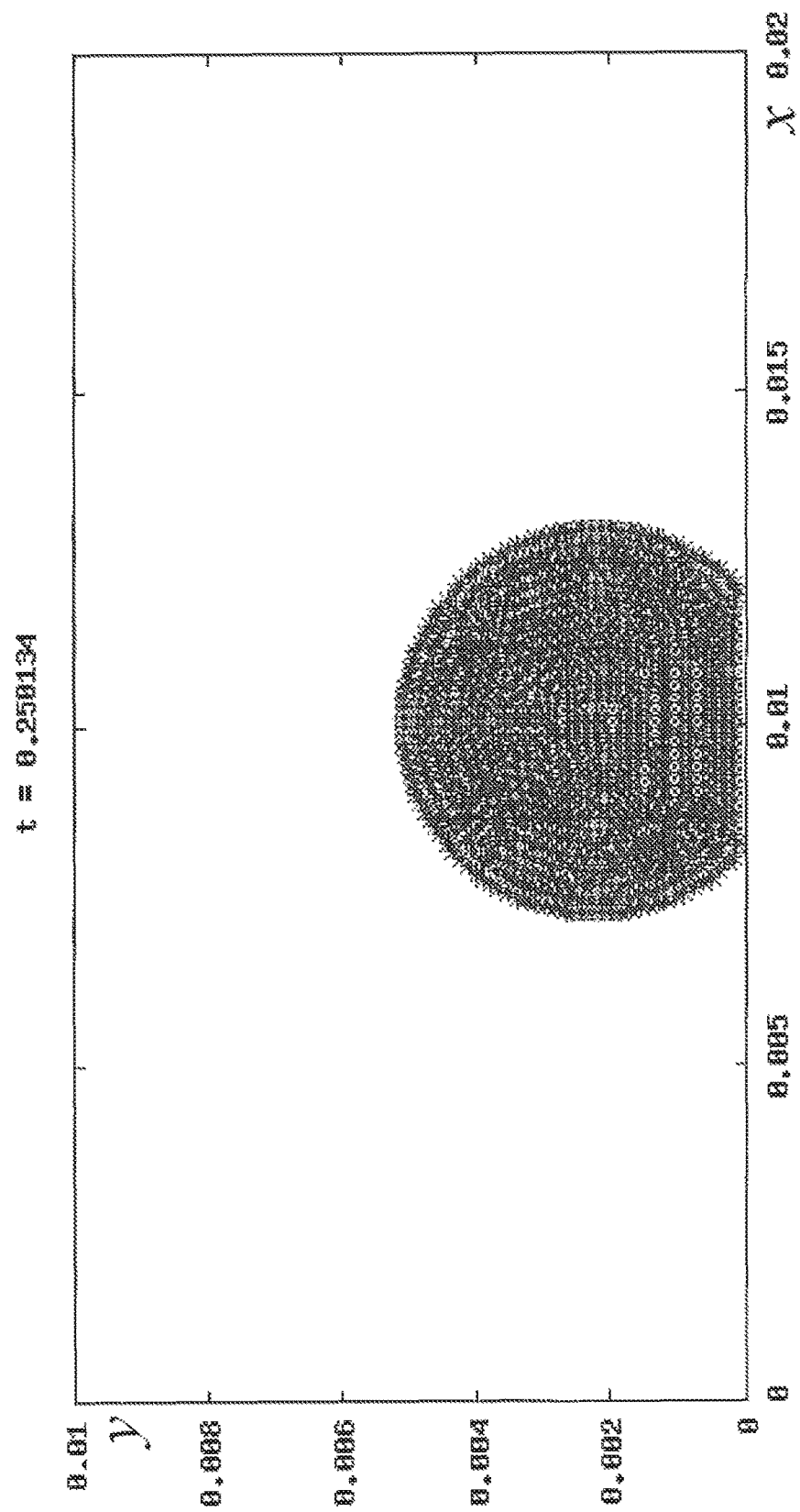
FIG. 23 is a diagram representing wettability with respect to a solid surface with surface tension applied (example 2)

FIGS. 22 and 23 are diagrams representing wettability with respect to a solid surface by applying surface tension using the technique described above. FIG. 22 depicts a situation in which the following formulae are satisfied.

$$\gamma_g = 0.1$$

$$\gamma_s = -\frac{\sqrt{3}\,\gamma_g}{2}$$

FIG. 22 also depicts a situation in which the following formulae are satisfied.

$$\gamma_g = 0.1$$

$$\gamma_s = \frac{\gamma_g}{2}$$

FIGS. 22 and 23 depict the shape of a fluid at rest. In each of the figures, a difference in contact angle is expressed by changing a surface tension coefficient.

Figure 24:
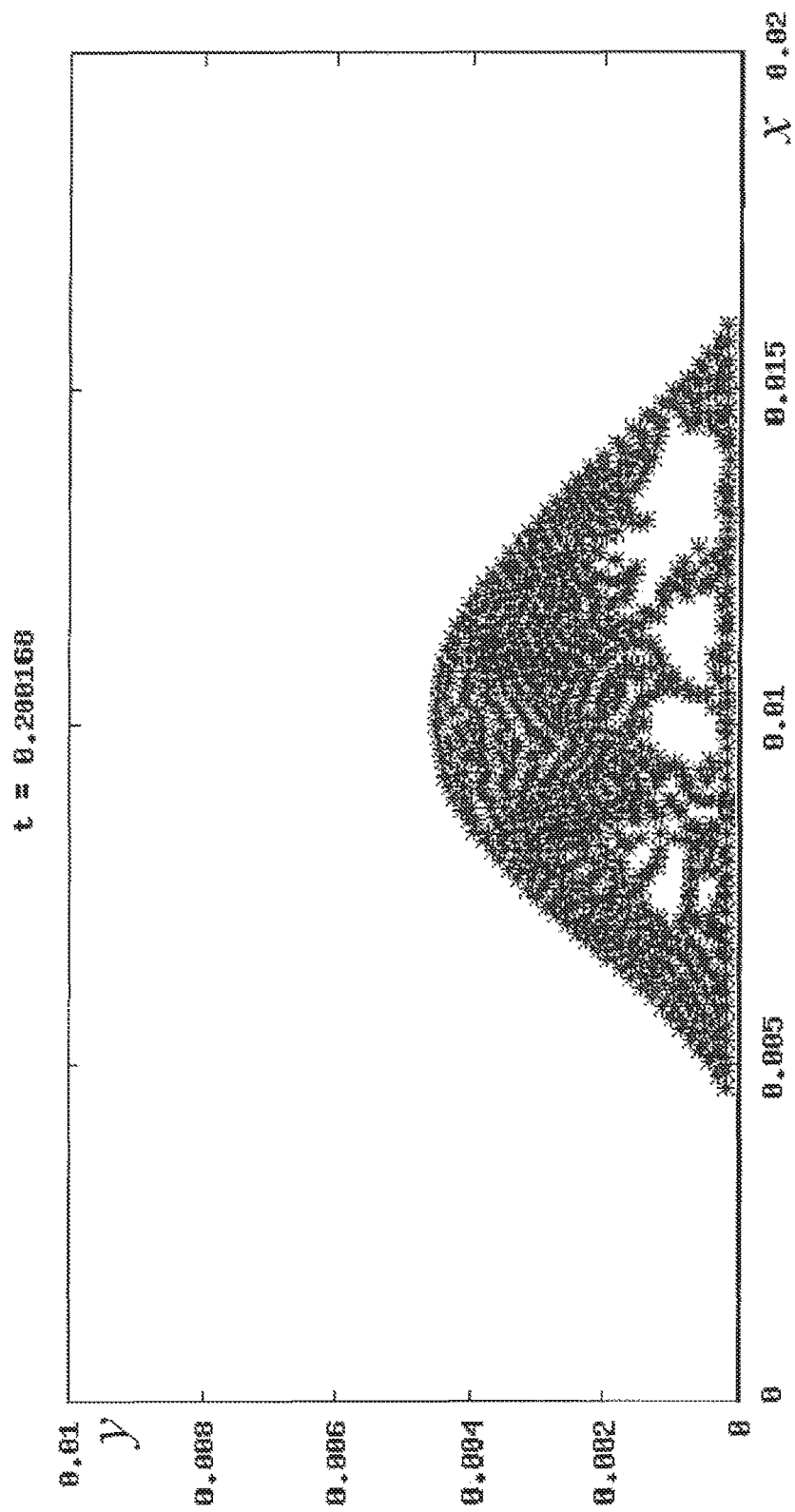
FIG. 24 illustrates an exemplary situation without introduction of a correction term.
Figure 25:
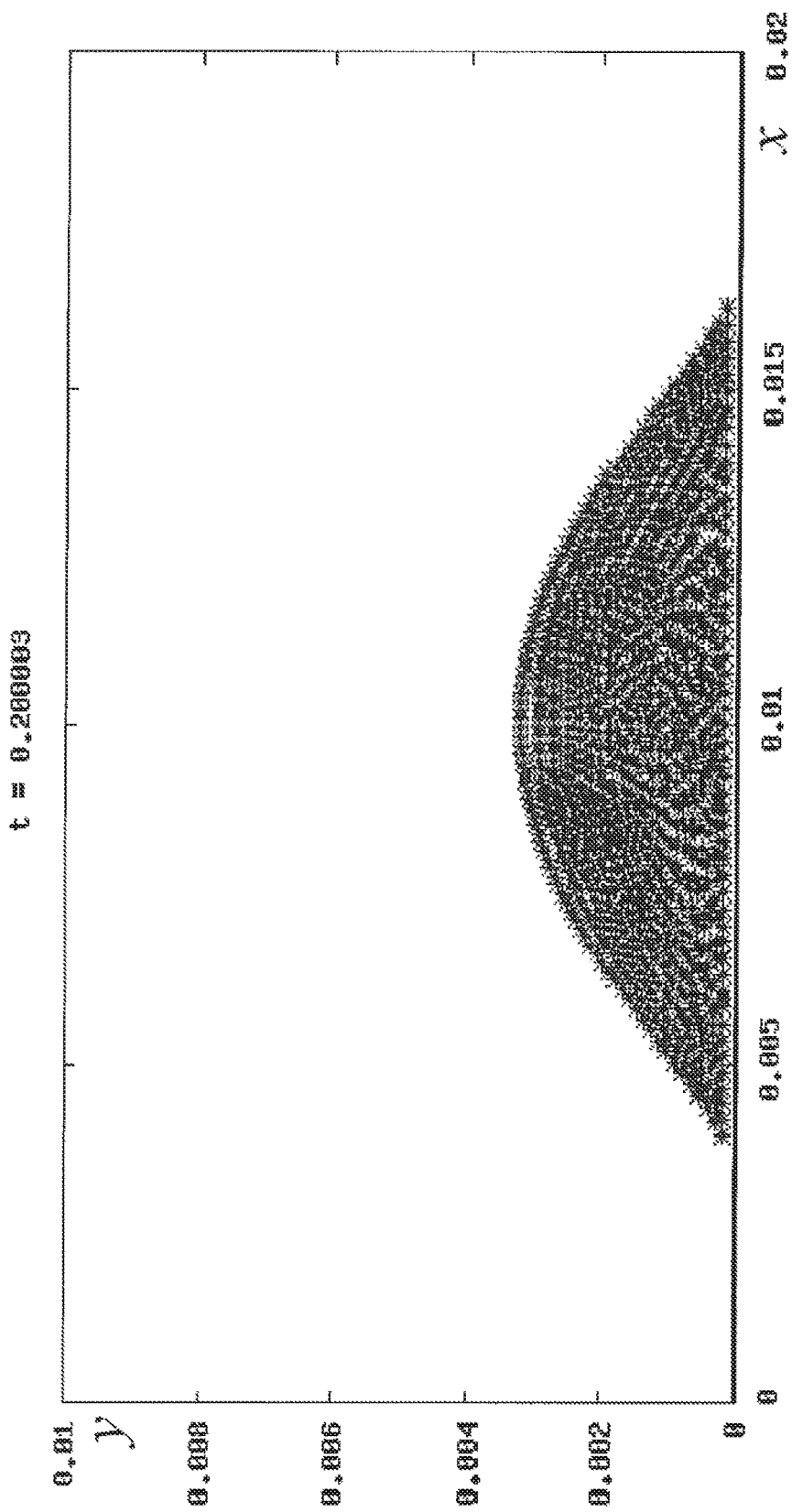
FIG. 25 illustrates an exemplary situation with introduction of a correction term.

FIG. 24 illustrates a situation without introduction of a correction term calculated using formulae 19 and 20. FIG. 25 illustrates a situation with introduction of the correction term.

Unnatural holes are made in FIG. 24, and calculations become unstable. Calculations are stably performed in FIG. 25, and this means that the correction term is effective.

Parameters for the simulation are as follows.

Note that a y axis corresponds to a perpendicular downward direction, and y=0 corresponds to a wall surface. A gravitational acceleration is 9.8 [m/s$^2$], and the number of particles is 900. An initial shape is a square wherein particles are located on a lattice with a length of 0.00167 [m].

A viscosity coefficient μ is 0.01 [Pa·s]; ξ=4.9633; a radius of influence h is 0.000333 [m]; a density is 1000 [kg/m$^3$]; a sound velocity c is 23.78 [m/s]; parameters of the correction terms are K=1 and $C_g=c^2$. Surface tension is as follows.

$$\Gamma_g = 0.1 [N/m],$$

$$\Gamma_s = -\frac{\sqrt{3}}{2}\Gamma_s$$

As described above, in calculations of a particle method, an embodiment may be applied to a calculation of fluid motion with effective surface tension. In particular, the embodiment is effective for, for example, a simulation of the pouring of melted metal or resin.

Figure 26:
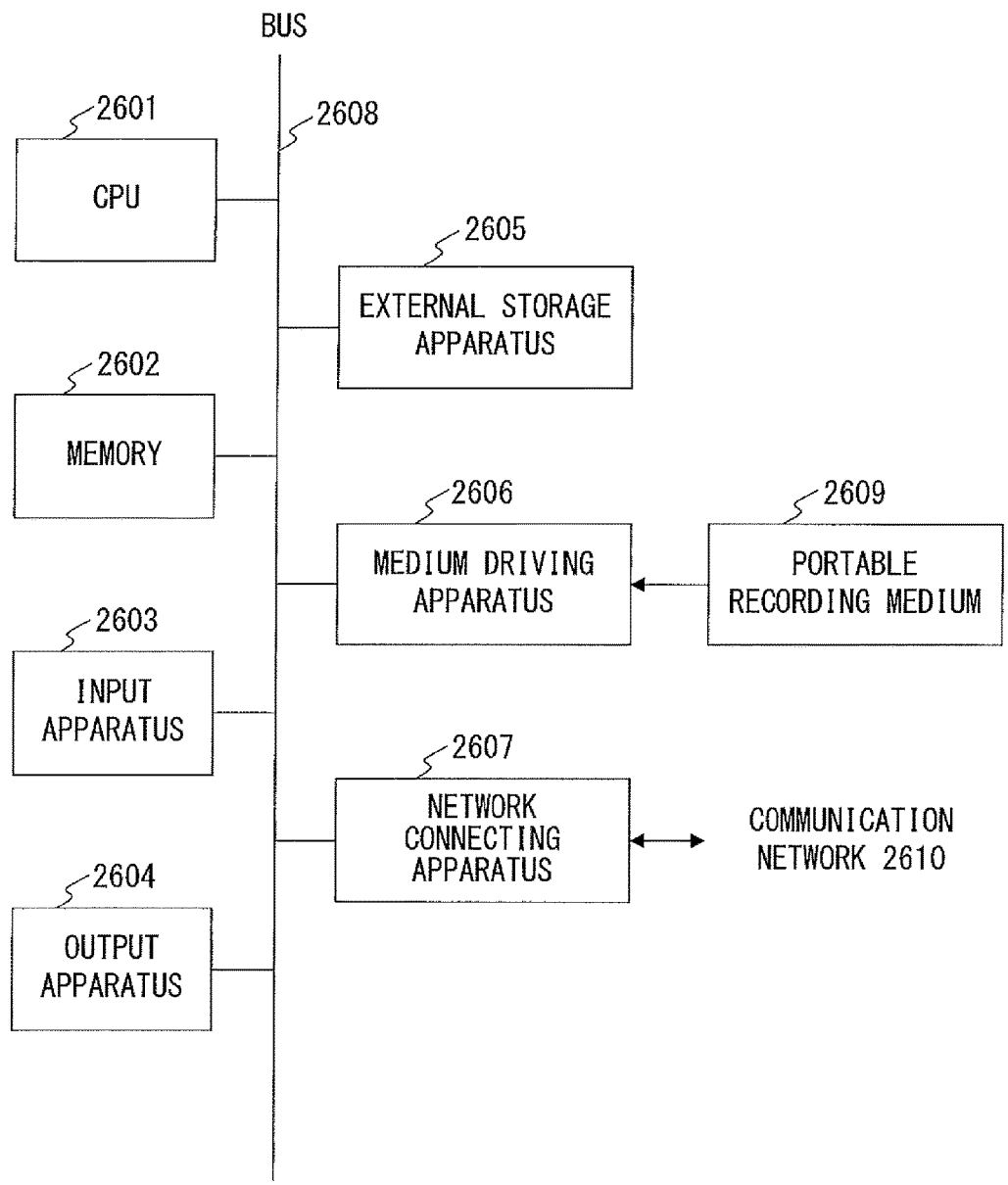
FIG. 26 is a configuration diagram of an information processing apparatus.

The simulation device in FIG. 5 is achievable using, for example, an information processing apparatus (computer) illustrated in FIG. 26. The information processing apparatus in FIG. 26 includes a Central Processing Unit (CPU) 2601, a memory 2602, an input apparatus 2603, an output apparatus 2604, an external storage apparatus 2605, a medium driving apparatus 2606, and a network connecting apparatus 2607. These elements are connected to each other by a bus 2608.

The memory 2602 is a semiconductor memory, e.g., a Read Only Memory (ROM), a Random Access Memory (RAM), or a flash memory, and stores a program and data used in the simulation processes. In one possible example, the CPU 2601 performs the simulation processes described above by executing a program using the memory 2602. The memory 2602 may be used as the storage unit 502 in FIG. 5.

The input apparatus 2603 is, for example, a keyboard or a pointing device and is used to input information and an instruction from an operator. The output apparatus 2604 is, for example, a display apparatus, a printer, or a speaker and is used to output a result of processing and to send a query to an operator. The output apparatus 2604 may be used as the output unit 503 in FIG. 5.

The external storage apparatus 2605 is, for example, a magnetic disk apparatus, an optical disk apparatus, a magnetic optical disk, or a tape apparatus. The external storage apparatus 2605 includes a hard disk drive. The information processing apparatus may store a program and data in the external storage apparatus 2605 and may use the program and data by loading them into the memory 2602.

The medium driving apparatus 2606 drives a portable recording medium 2609 and accesses data recorded therein. The portable recording medium 2609 is, for example, a memory device, a flexible disk, an optical disk, or a magnetic optical disk. The portable recording medium 2609 also includes, for example, a Compact Disk Read Only Memory (CD-ROM), a Digital Versatile Disk (DVD), and a Universal Serial Bus (USB) memory. The operator may store a program and data in the portable recording medium 2609 and may use the program and data by loading them into the memory 2602.

As described above, the computer-readable recording media that store a program and data used in the simulation process include physical (non-transitory) recording media such as the memory 2602, the external storage apparatus 2605, and the portable recording medium 2609.

The network connecting apparatus 2607 is a communication interface that is connected to a communication network 2610 and that performs data conversion associated with a communication. The information processing apparatus may receive a program and data from an external apparatus via the network connecting apparatus 807 and may use the program and data by loading them into the memory 2602. The network connecting apparatus 2607 may be used as the output unit 503 in FIG. 5.

An embodiment allows an appropriate simulation result to be output without exhibiting a nonphysical behavior.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process for simulating surface tension of a fluid, the process comprising:

determining, in accordance with a convex hull configuration algorithm, a calculated interface based on a fluid model expressing the fluid as a collection of liquid particles according to an input boundary condition and an initial condition;

calculating combined surface energy of the calculated interface by combining a first term representing first surface energy of a liquid-air interface, a second term representing second surface energy of a liquid-solid interface, and a third term that becomes infinite when a distance between a liquid particle and a solid is 0, each of the first and second terms including a surface tension coefficient changed while calculating the combined surface enemy of the calculated interface;

determining the surface tension of the calculated interface according to the combined surface energy;

determining a shape of the fluid, based on the surface tension, for each of sets of predetermined time intervals; and representing the shape of the fluid during each of the sets of predetermined time intervals.

2. The non-transitory computer-readable recording medium according to claim 1, wherein the calculating of the combined surface energy of the liquid-air interface adds a correction term to account for nonuniformity of surface distribution of the liquid particles of the fluid.

3. The non-transitory computer-readable recording medium according to claim 1, wherein the calculating of the combined surface energy of the liquid-air interface adds a correction term to account for volume deformations of the fluid.

4. The non-transitory computer-readable recording medium according to claim 1, wherein the fluid is at least one of a resin and a melted metal poured onto a solid surface.

5. The non-transitory computer-readable recording medium according to claim 4, wherein the liquid-solid interface is between the fluid and the solid surface and the shape of the fluid represents the wettability of the solid surface.

6. The non-transitory computer-readable recording medium according to claim 5, wherein the shape of the fluid is determined from a contact angle between the fluid and the solid surface calculated based on the fluid model.

7. A simulation method for simulating surface tension of a fluid, the simulation method comprising:

determining, in accordance with a convex hull configuration algorithm, a calculated interface based on a fluid model expressing the fluid as a collection of liquid particles according to an input boundary condition and an initial condition by a computer;

calculating combined surface energy of the calculated interface by combining a first term representing first surface energy of a liquid-air interface, a second term representing second surface energy of a liquid-solid interface, and a third term that becomes infinite when a distance between a liquid particle and a solid is 0, each of the first and second terms including a surface tension coefficient changed while calculating the combined surface energy of the calculated interface by the computer;

determining the surface tension of the calculated interface according to the combined surface energy by the computer;

determining a shape of the fluid, based on the surface tension, for each of sets of predetermined time intervals; and representing the shape of the fluid during each of the sets of predetermined time intervals.

8. The simulation method according to claim 7, wherein the fluid is at least one of a resin and a melted metal poured onto a solid surface.

9. The simulation method according to claim 8, wherein the liquid-solid interface is between the fluid and the solid surface and the shape of the fluid represents the wettability of the solid surface.

10. The simulation method according to claim 9, wherein the shape of the fluid is determined from a contact angle between the fluid and the solid surface calculated based on the fluid model.

11. A simulation device for simulating surface tension of a fluid, the simulation device comprising:

a processor configured to determine, in accordance with a convex hull configuration algorithm, a calculated interface based on a fluid model expressing the fluid as a collection of liquid particles according to an input boundary condition and an initial condition, calculate combined surface energy of the calculated interface by combining a first term representing first surface energy of a liquid-air interface, a second term representing second surface energy of a liquid-solid interface, and a third term that becomes infinite when a distance between a liquid particle and a solid is 0, each of the first and second terms including a surface tension coefficient changed while calculating the combined surface energy of the calculated interface, determine the surface tension of the calculated interface according to the combined surface energy, determine a shape of the fluid, based on the surface tension, for each of sets of predetermined time intervals; and represent the shape of the fluid during each of the sets of predetermined time intervals.

12. The simulation device according to claim 11, wherein the fluid is at least one of a resin and a melted metal poured onto a solid surface.

13. The simulation device according to claim 12, wherein the liquid-solid interface is between the fluid and the solid surface and the shape of the fluid represents the wettability of the solid surface.

14. The simulation device according to claim 13, wherein the shape of the fluid is determined from a contact angle between the fluid and the solid surface calculated based on the fluid model.

* * * * *